United States Patent
Mate et al.

(10) Patent No.: US 9,317,598 B2
(45) Date of Patent: *Apr. 19, 2016

(54) METHOD AND APPARATUS FOR GENERATING A COMPILATION OF MEDIA ITEMS

(75) Inventors: Sujeet Shyamsundar Mate, Tampere (FI); Igor Danilo Diego Curcio, Tampere (FI); Francesco Cricri, Tampere (FI)

(73) Assignee: Nokia Technologies Oy, Espoo (FI)

( * ) Notice: Subject to any disclaimer, the term of this patent is extended or adjusted under 35 U.S.C. 154(b) by 359 days.

This patent is subject to a terminal disclaimer.

(21) Appl. No.: 12/877,353

(22) Filed: Sep. 8, 2010

(65) Prior Publication Data
US 2012/0060077 A1 Mar. 8, 2012

(51) Int. Cl.
*G06F 17/00* (2006.01)
*G06F 17/30* (2006.01)

(52) U.S. Cl.
CPC .............................. *G06F 17/30843* (2013.01)

(58) Field of Classification Search
CPC ............. G11B 20/10; G06F 17/30017; G06F 17/30041; G06F 17/30044; G06F 17/30056; G06F 17/30781; G06F 17/30843; G06F 17/30849; G06F 17/30038; G06F 17/30174
USPC ......................................... 715/200, 201, 202
See application file for complete search history.

(56) References Cited

U.S. PATENT DOCUMENTS

| | | | |
|---|---|---|---|
| 6,144,375 A * | 11/2000 | Jain et al. ....................... 715/251 |
| 6,934,461 B1 | 8/2005 | Strub et al. | |
| 6,956,573 B1 | 10/2005 | Bergen et al. | |
| 6,987,528 B1 | 1/2006 | Nagahisa et al. | |
| 7,539,659 B2 | 5/2009 | Wong et al. | |
| 7,659,848 B2 * | 2/2010 | Dooley et al. ............ 342/357.57 |
| 7,773,813 B2 | 8/2010 | Hua et al. | |
| 7,774,306 B1 | 8/2010 | Wunker et al. | |
| 2006/0026207 A1 * | 2/2006 | Sakai et al. ................. 707/104.1 |
| 2006/0170956 A1 * | 8/2006 | Jung et al. .................... 358/1.15 |
| 2007/0038938 A1 | 2/2007 | Canora et al. | |

(Continued)

FOREIGN PATENT DOCUMENTS

| EP | 0959418 A2 | 11/1999 |
|---|---|---|
| WO | WO 2005/009022 A2 | 1/2005 |
| WO | WO2009/026159 A1 | 2/2009 |

OTHER PUBLICATIONS

U.S. Appl. No. 12/618,752, filed Nov. 15, 2009, Sujeet Mate et al.

(Continued)

*Primary Examiner* — Laurie Ries
*Assistant Examiner* — Ariel Mercado
(74) *Attorney, Agent, or Firm* — Ditthavong & Steiner, P.C.

(57) ABSTRACT

In an exemplary embodiment, an approach is provided for dynamically generating a compilation of media items during playback of one or more media items. A plurality of media items is received from a plurality of mobile devices. Respective context vectors for the media items are determined. The context vectors include, at least in part, orientation information, geo-location information, timing information, or a combination thereof associated with the creation of the respective media items. A compilation of at least a portion of the media items is dynamically generated during playback of one or more of the media items based, at least in part, on the context vectors.

22 Claims, 18 Drawing Sheets

(56) References Cited

U.S. PATENT DOCUMENTS

| | | | |
|---|---|---|---|
| 2007/0110338 A1* | 5/2007 | Snavely et al. | 382/305 |
| 2008/0019661 A1* | 1/2008 | Obrador et al. | 386/52 |
| 2009/0063419 A1 | 3/2009 | Nurminen et al. | |
| 2009/0167786 A1 | 7/2009 | Stanions et al. | |
| 2010/0146055 A1* | 6/2010 | Hannuksela | 709/206 |
| 2010/0214419 A1* | 8/2010 | Kaheel et al. | 348/207.1 |
| 2010/0274816 A1 | 10/2010 | Guzik et al. | |
| 2011/0161348 A1 | 6/2011 | Oron | |

OTHER PUBLICATIONS

Calibrating an Outdoor Distributed Camera Network using Laser Range Finder Data, Ortega et al, The 2009 IEEE/RSJ International Conference on Intelligent Robots and Systems, Oct. 11-15, 2009 St. Louis, USA, pp. 303-308.

Calibrating Distributed Camera Networks, Devarajan et al., Proceedings of the IEEE, Issue 10, vol. 96, Oct. 2008, pp. 1625-1639.

Towards Extracting Semantically Meaningful Key Frames From Personal Video Clips: From Humans to Computers, Luo et al., IEEE Transactions on Circuits and Systems for Video Technology, vol. 19, No. 2, Feb. 2009, pp. 289-301.

Sumi, Yasuyuki, et al., Collaborative Capturing, Interpreting, and Sharing of Experiences, accessed: May 24, 2011, pp. 1-3, http://www.sciweavers.org/publications/collaborative-capturing-interpreting-and-sharing-experiences.

European Search Report for related European Patent Application No. 11180392 dated Nov. 17, 2011, pp. 1-6.

Final Rejection for related U.S. Appl. No. 13/012,547 dated Jul. 3, 2012, pp. 1-14.

Office Action for related U.S. Appl. No. 13/012,547 dated Jan. 16, 2013, pp. 1-15.

* cited by examiner

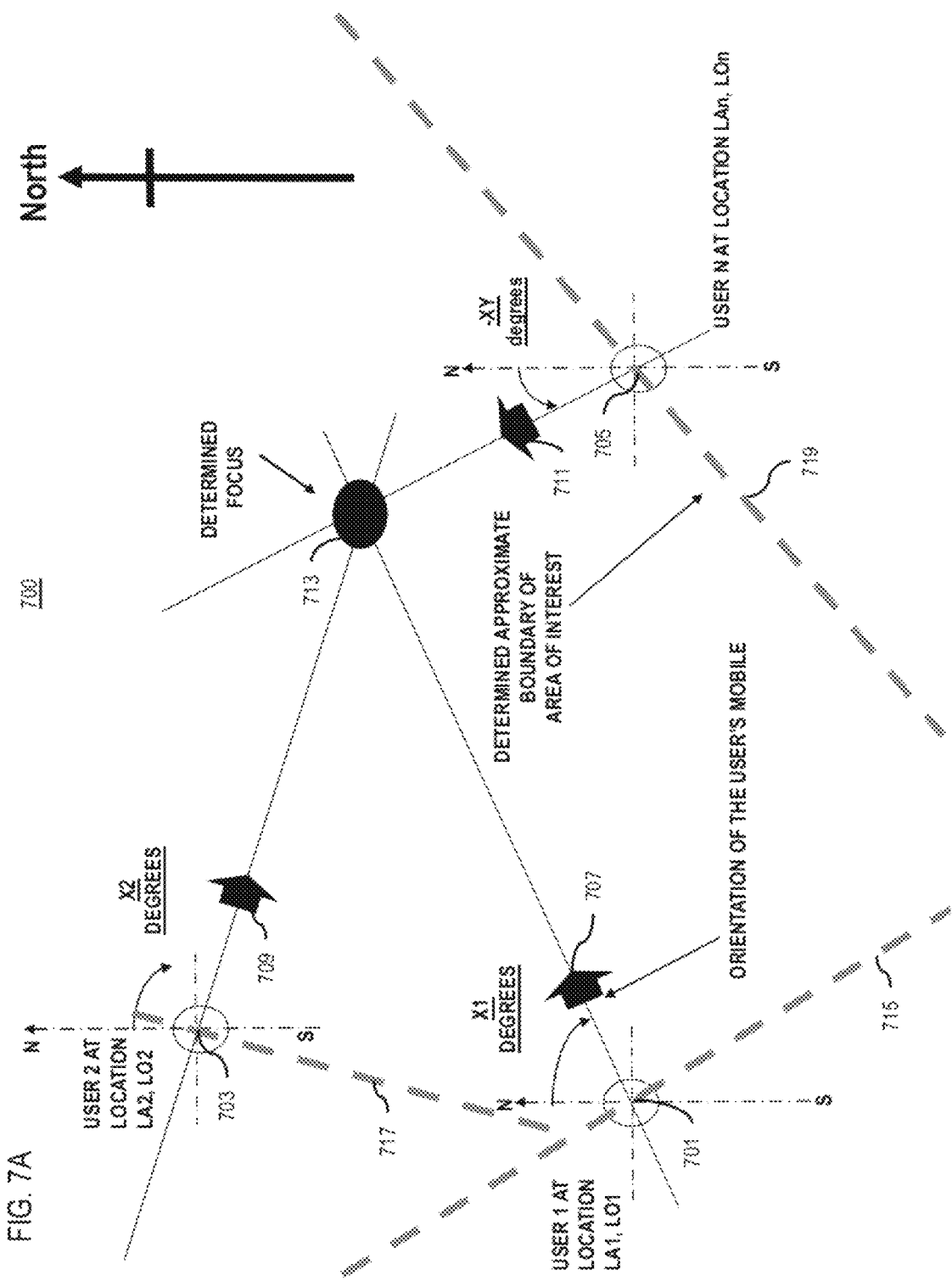

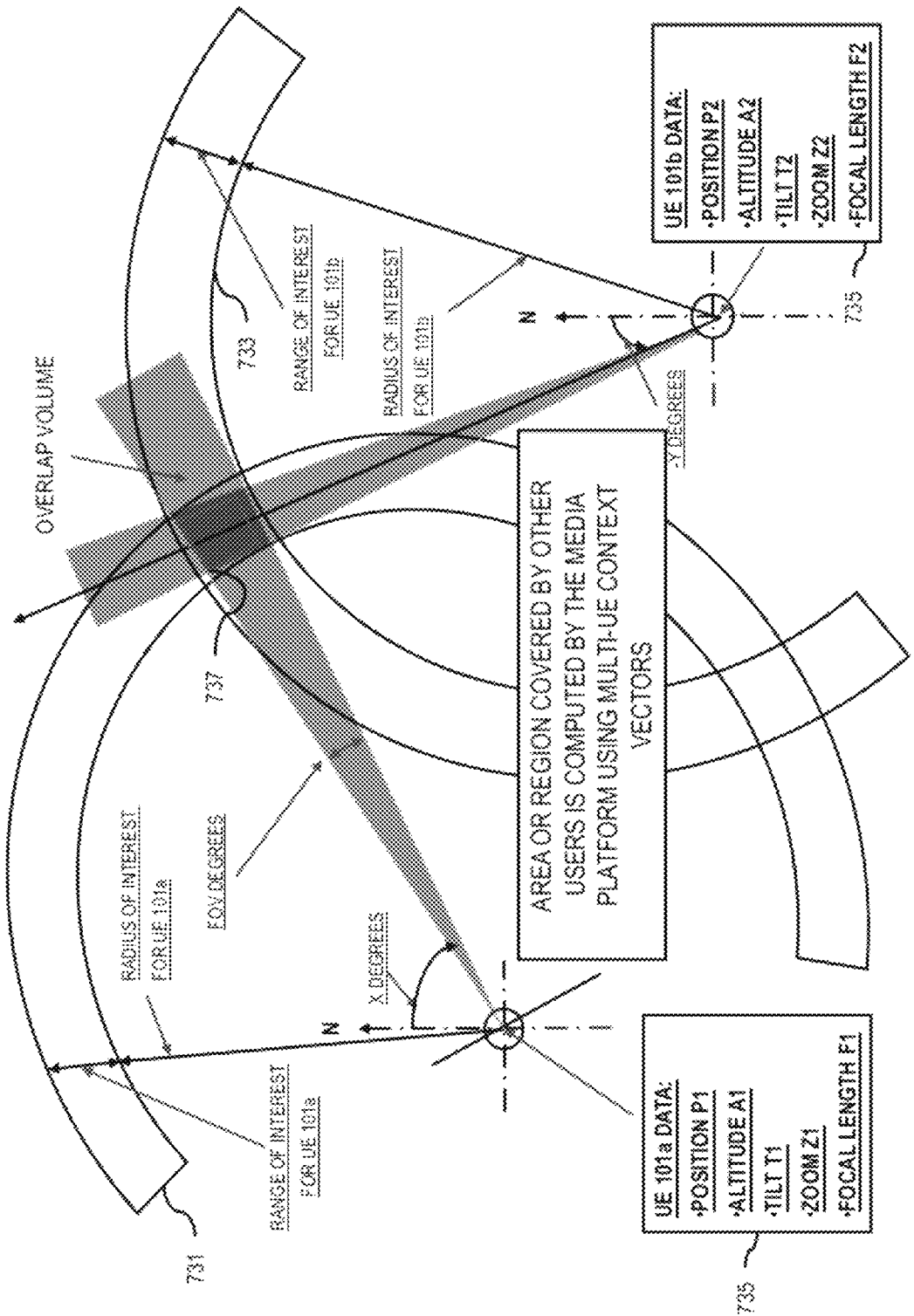

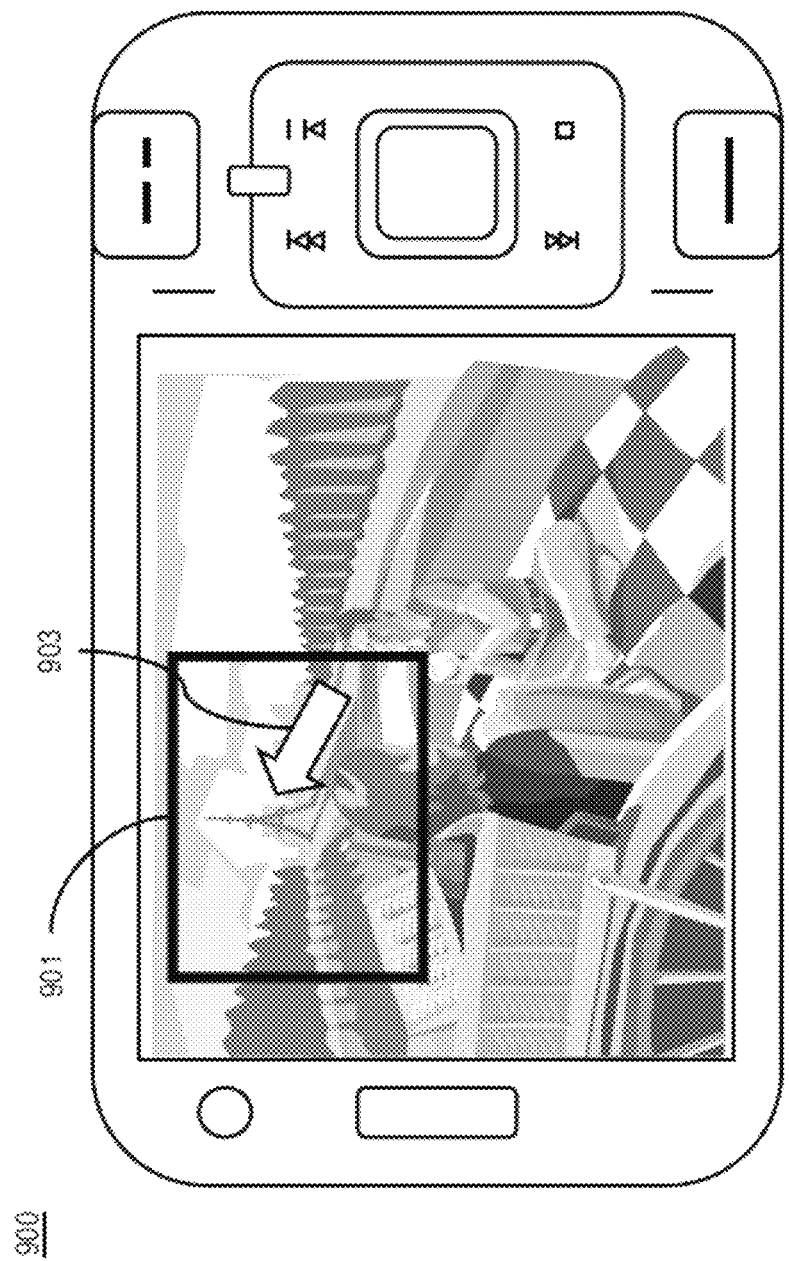

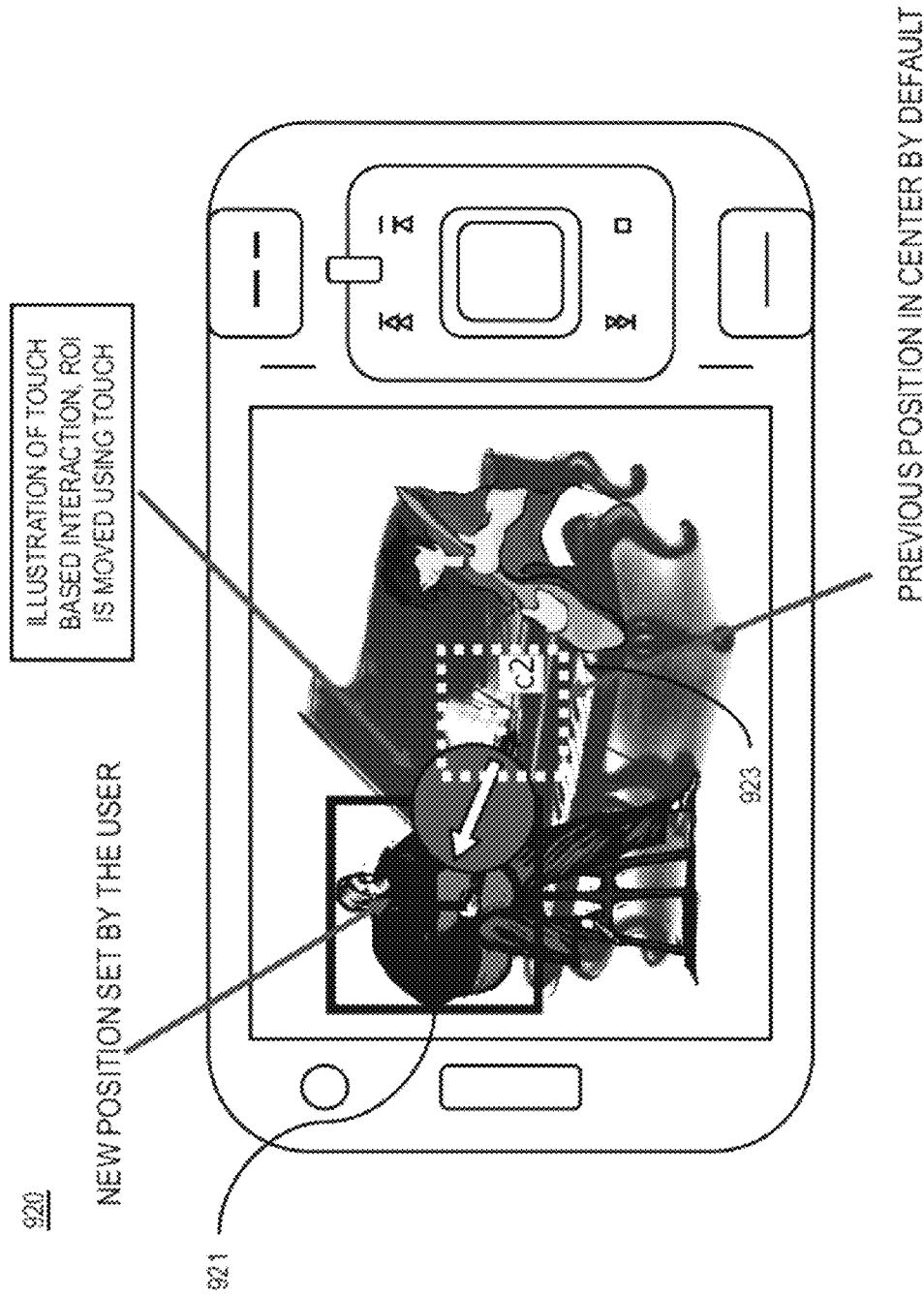

METHOD AND APPARATUS FOR GENERATING A COMPILATION OF MEDIA ITEMS

BACKGROUND

Service providers and device manufacturers (e.g., wireless, cellular, etc.) are continually challenged to deliver value and convenience to consumers by, for example, providing compelling network services. Important differentiators in the industry are application and network services that offer entertainment (e.g., media) and location services. In particular, media sharing services allow for distribution of content to other users of the media sharing service. Traditionally, the content distributed on such media sharing services is uploaded by one or more users. Interesting transformations of the content can be utilized to improve user experience. However, such transformations are generally limited due to technical challenges and limitations that exist for enabling the transformations. For example, only basic transformations may be accomplished utilizing basic media.

SOME EXAMPLE EMBODIMENTS

Therefore, there is a need for an approach for generating a compilation of media items.

According to one embodiment, a method comprises receiving a plurality of media items. The method also comprises determining respective context vectors for the plurality of media items. The context vectors include, at least in part, orientation information, geo-location information, timing information, or a combination thereof associated with the creation of respective media items. The method further comprises determining to generate a compilation of at least a portion of the media items based, at least in part, on the context vectors.

According to another embodiment, an apparatus comprises at least one processor, and at least one memory including computer program code, the at least one memory and the computer program code configured to, with the at least one processor, cause, at least in part, the apparatus to receive a plurality of media items. The apparatus is also caused to determine respective context vectors for the plurality of media items. The context vectors include, at least in part, orientation information, geo-location information, timing information, or a combination thereof associated with the creation of respective media items. The apparatus is further caused to determine to generate a compilation of at least a portion of the media items based, at least in part, on the context vectors.

According to another embodiment, a computer-readable storage medium carries one or more sequences of one or more instructions which, when executed by one or more processors, cause, at least in part, an apparatus to receive a plurality of media items. The apparatus is also caused to determine respective context vectors for the plurality of media items. The context vectors include, at least in part, orientation information, geo-location information, timing information, or a combination thereof associated with the creation of respective media items. The apparatus is further caused to determine to generate a compilation of at least a portion of the media items based, at least in part, on the context vectors.

According to another embodiment, an apparatus comprises means for receiving a plurality of media items. The apparatus also comprises means for determining respective context vectors for the plurality of media items. The context vectors include, at least in part, orientation information, geo-location information, timing information, or a combination thereof associated with the creation of respective media items. The apparatus further comprises means for determining to generate a compilation of at least a portion of the media items based, at least in part, on the context vectors.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIGS. 7A-7C are map diagrams displaying example maps of locations utilized to generate context vector information, according to various embodiments;

FIGS. 9A-9E are diagrams of user interfaces utilized in the processes of FIGS. 4 and 8, according to various embodiments;

DESCRIPTION OF SOME EMBODIMENTS

Examples of a method, apparatus, and computer program for generating a compilation of media items are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
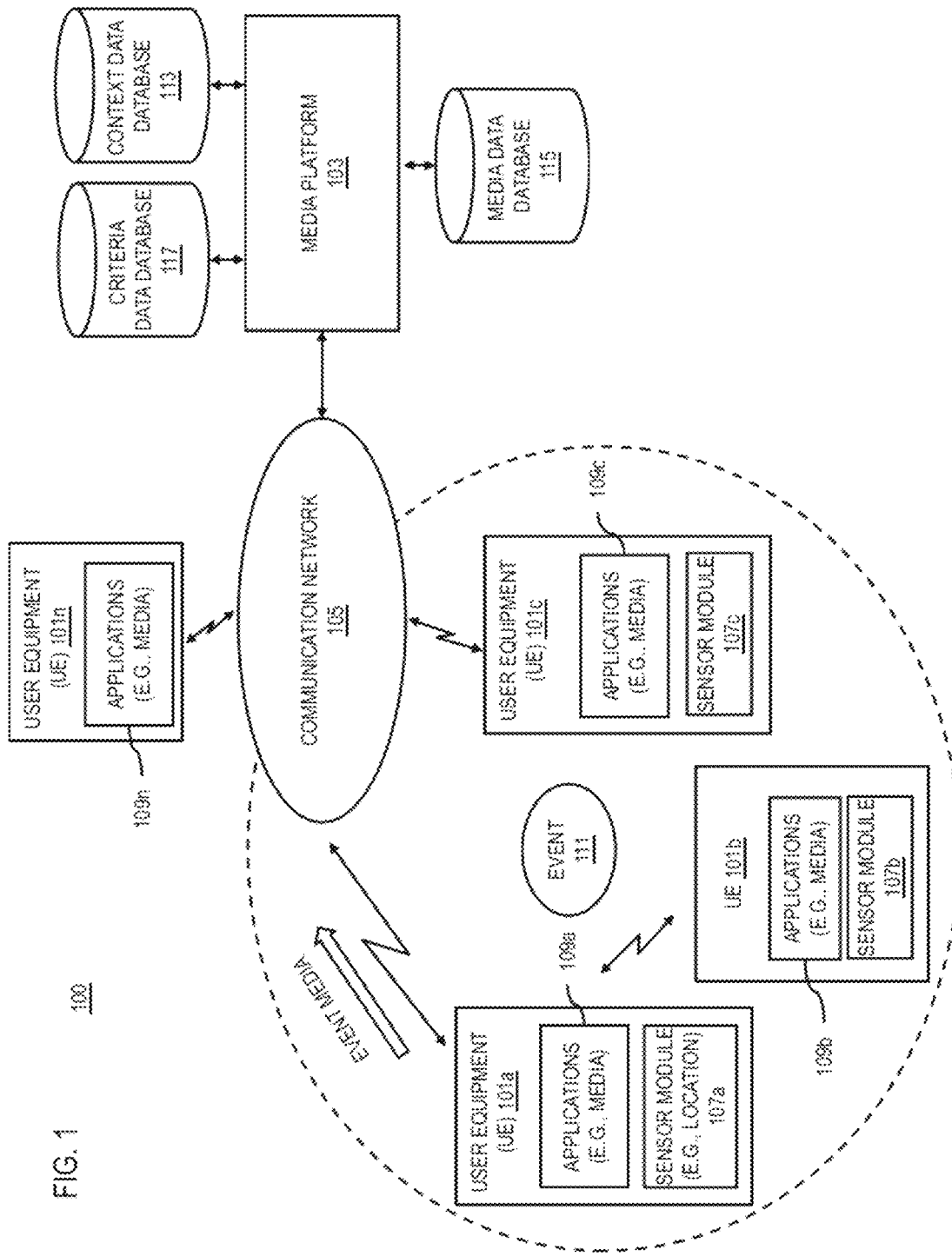
FIG. 1 is a diagram of a system capable of generating a compilation of media items based on context vectors associated with the media items, according to one embodiment.

FIG. 1 is a diagram of a system capable of generating a compilation of media items based on context vectors associated with the media items, according to one embodiment. In a mobile world, an increasing number of services and applications are targeted at providing social services and distributing media captured by individual users. As such, advances in mobile multimedia technology have given rise to increase in user generated content. These users can share the content with others using one or more platforms (e.g., via the Internet). Increases in accessibility of the internet and bandwidth available to wireless and wired users, consumers can easily be distributed such media.

Individual users commonly record media (e.g., video, audio, images, etc.) at events that the users find interesting. Examples of events include concerts, dance festivals, carnivals, etc. Moreover, events can have one or more focus points and can be attended by more than one person. Many events are recorded by more than one user using a personal recording device (e.g., a mobile phone, a camcorder, a digital camera, etc.). Users may wish to view media associated with the events. These users may wish to view the media using different views corresponding to uploaded media of the events.

A more advantageous way to view such content would be to automatically enhance or customize media to generate a synthesized or machine-generated compilation of media items. As used herein, the term media item refers to media that can be created or generated. Media items can be uploaded (e.g., via a stream or file transfer) to a platform for generating the compilation. However, many technical challenges are present in generating such a synthesized compilation. One such challenge is to determine what view is covered by each media item associated with an event. Another technical challenge includes determining what content to include in a synthesized compilation. For example, one or more media items may include similar or the same content at the same time. Which one of the media items should be included in the media compilation? Further, more than one interesting activity or event (e.g., sub-event) can occur near a particular location. It can be challenging to determine which sub-event to focus upon when generating the compilation. In certain embodiments, a synthesized compilation is a compilation that is generated automatically or otherwise without need for manual instructions.

FIG. 1 is a diagram of a system capable of generating a compilation of media items based on context vectors associated with the media items, according to one embodiment. Information collected from mobile devices (e.g., user equipment (UE) 101a-101c) can be utilized to capture the media items. In one embodiment, the UEs 101a-101c capture media items (e.g., photos, video clips, audio clips, etc.) and transmit the media items and related information (e.g., context vectors) to a media platform 103 via a communication network 105. The media items can be captured, for instance, to explicitly transmit information about an event or may be captured for other purposes (e.g., sightseeing, general interest, etc.) but then co-opted for use in the approach described herein. The media may be analyzed to determine information about the existence of an event which can be transmitted to the UEs 101a-101c. Further, media items can be combined to generate the compilation based on one or more criteria and a plurality of media items. The compilation can thus be a customized director's cut combining various media items for a user.

The UE 101 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.). The UE 101 may include a sensor module 107a-107c to determine context vectors (e.g., location information, timing information, etc.) of the UE 101. The sensor module 107 may be utilized by one or more applications 109 (e.g., media applications 109a-n, event applications, etc.). The system 100 has been simplified for to include three UEs 101a-101c to capture the event, however, it is contemplated that any multiple number of UEs 101 (e.g., more than two UEs 101) can be utilized in capturing information about the event.

The UEs 101a-101c may utilize respective media applications 109 to capture media of an event 111 as well as the location, via a location sensor of the sensor module 107, and other information (e.g., compass information, accelerometer tilt information, etc.) about the UE 101 during the event. In certain embodiments, the event may include a static event (e.g., a normal occurrence such as media capture around a monument), a sudden incident (e.g., a spontaneous occurrence such as an accident or an impromptu folk festival that users determine is a good reason to capture media), a special event (e.g., an occurrence that is indicated to be more important by the media platform 103 based on certain criteria), a combination thereof, or the like.

When the media is captured, a context vector can be determined and associated with the media. In certain embodiments, a context vector is one or more data items that can be associated with the media. As such, a context vector can include time information, a position (Pi) of the UE 101, an altitude (Ai) of the UE 101, a tilt (Ti) of the UE 101, an orientation (Oi) of the UE 101, a zoom level (Zi) of the UE 101, a focal length (Fi) of the UE 101, a field of view (FOVi) of the UE 101, a radius of interest (RadiusOIi) of the UE 101 while capturing the media content, a range of interest (RangeOIi) of the UE 101 while capturing the media content, or a combination thereof. The position can be detected from one or more sensors of the UE 101 (e.g., via a Global Positioning System (GPS)). Further, the altitude can be detected from one or more sensors such as an altimeter and/or GPS. The tilt of the UE 101 can be based on a reference point (e.g., a camera sensor location) with respect to the ground based on accelerometer information. Moreover, the orientation can be based on compass (e.g., magnetometer) information and may be based on a reference to north. One or more zoom levels, a focal length, and a field of view can be determined according to a camera sensor. Further, the radius of interest and/or range of interest can be determined based on one or more of the other parameters or another sensor (e.g., a range detection sensor).

In certain embodiments, capture of a media item can include corresponding context vector information. For example one or more frames of a video can have associated with it an audio component as well as a context vector. Thus the context vector can be associated with one or more segments of the media item. Further, the context vector can be stored in one or more data structures or forms, such as RDF/XML (Resource Description Framework/Extensible Markup Language).

Further, the media platform 103 can automatically determine or infer information about the occurrence of an event or other event related information by evaluating one or more of the context vectors received from one or more UEs 101a-101c during an event. By way of example, a context vector can be transmitted as a data structure of information (e.g., independent of media content and/or with the media content). The context vector may be utilized to determine one or more focal points of a plurality of UEs 101 by using the location and orientation of each of multiple UEs 101 (e.g., the intersection of the orientation or views of the UEs 101). This focus may be determined to be a center or other important point of the event. In one scenario, the context vector is separated from the media to conserve bandwidth when transmitting the context vector to the media platform 103. Under this scenario, the context vectors may be transmitted in real time or near real time while the actual media is streamed or transmitted at a later time. With this approach, guidance can be provided to other users capturing the event 111. Moreover, a media application 109 may include options as to participate or not participate in a service provided by the media platform 103 to determine the existence of events and/or publish media of the user of the application 109. In certain embodiments, to encourage participation, the user may be recognized or compensated if the user's media is presented to other users.

The media platform 103 may receive the context vectors and the media from UEs 101 and store the information in one or more databases. The context vectors can be stored in a context data database 113. The context data database 113 may be utilized to store current and historical data about events. Moreover, the media platform 103 may have access to additional historical data (e.g., historical sensor data or additional historical information about a region that may or may not be associated with events) to determine if an event is occurring or has occurred at a particular time. This feature can be useful in determining if newly uploaded media items can be associated with one or more events. A media data database 115 can be utilized for collecting and storing media items. The media items may include metadata including associated content vectors.

The events or historical data may be sorted using the geo-location of the UEs 101 or a determined geo-location of events. Further, the media may be published from the media data database 115 to one or more UEs (e.g., UE 101n). The media platform 103 may additionally extract an identifier associated with a particular UE 101 from a received context vector and associate the user and/or UE 101 with a profile. The user profile may be utilized to collect historical event information about a particular UE 101 or user. This data may be used in determining how useful associated media items may be in a compilation.

The media platform 103 can utilize criteria from a criteria data database 117 to generate one or more compilations. As previously noted, the compilations can represent a director's cut of media items associated with an event 111. Generation of the compilations is further detailed in FIGS. 3 and 4.

By way of example, the communication network 105 of system 100 includes one or more networks such as a data network (not shown), a wireless network (not shown), a telephony network (not shown), or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

By way of example, the UEs 101 and media platform(s) 103, communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application headers (layer 5, layer 6 and layer 7) as defined by the OSI Reference Model.

In one embodiment, the UE 101 and media platform 103 interact according to a client-server model. According to the client-server model, a client process sends a message including a request to a server process, and the server process responds by providing a service. The server process may also return a message with a response to the client process. Often the client process and server process execute on different computer devices, called hosts, and communicate via a network using one or more protocols for network communications. The term "server" is conventionally used to refer to the process that provides the service, or the host computer on which the process operates. Similarly, the term "client" is conventionally used to refer to the process that makes the request, or the host computer on which the process operates. As used herein, the terms "client" and "server" refer to the processes, rather than the host computers, unless otherwise clear from the context. In addition, the process performed by a server can be broken up to run as multiple processes on multiple hosts (sometimes called tiers) for reasons that include reliability, scalability, and redundancy, among others.

Figure 2:
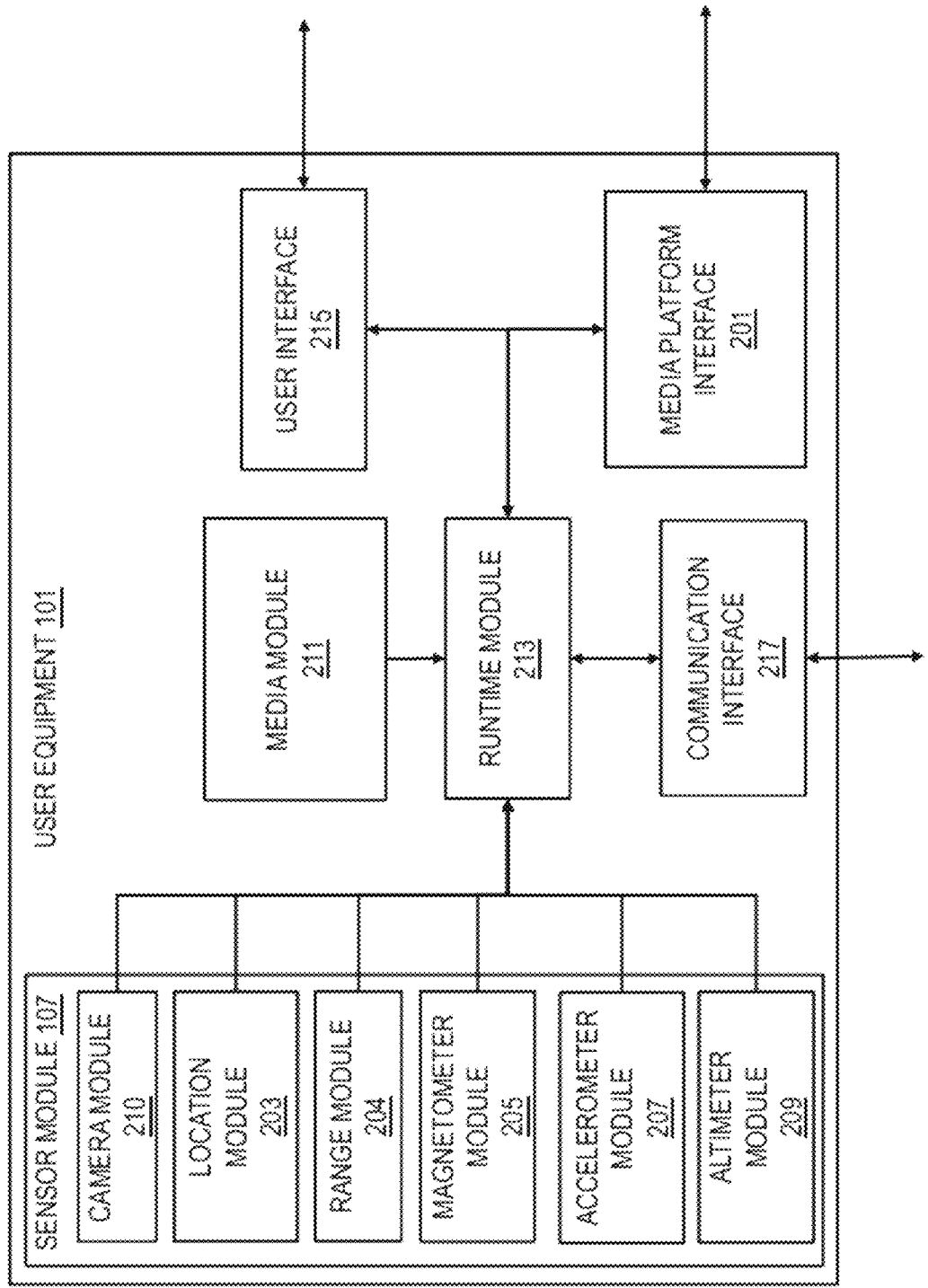
FIG. 2 is a diagram of the components of user equipment that can be utilized in generating media items, according to one embodiment.

FIG. 2 is a diagram of the components of a UE 101, according to one embodiment. By way of example, the UE 101 includes one or more components for collecting and transmitting media items and context vectors. It is contemplated that the functions of these components may be combined in one or more components or performed by other components of equivalent functionality. In this embodiment, the UE 101 includes a media platform interface 201 to communicate with the media platform 103, a sensor module 107 that includes a location module 203 to determine the location of a UE 101, a range module 204 to detect the range of an object from the UE 101 while capturing media, a magnetometer module 205 to determine horizontal orientation of the UE 101, an accelerometer module 207 to determine vertical orientation of the UE 101, an altimeter module 209 to determine altitude, a camera module 210 to capture images, and other sensor modules (not shown), a media module 211 that may be used to capture media, a runtime module 213 to execute applications on the UE 101, a user interface 215, and a communication interface 217. Information from the location module 203, range module 204, magnetometer module 205, accelerometer module 207, and media module 211 may be used to determine the direction or vector along which the UE 101 is aligned when, for instance, capturing event related media or information (e.g., the direction or vector along which a camera of the UE 101 is pointed when capturing an image of an event). In this way, the UE 101 may generate and transmit a context vector to media platform 103 that includes the directional and location information. Further, the UE 101 may embed the context vector in media transmitted to the media platform 103 to determine the existence of a current event, existence of a past event, or a combination thereof.

The media platform interface 201 is used by the runtime module 213 to communicate with a media platform 103. In some embodiments, the interface is used to upload media and context vectors for processing at the media platform 103. Further, the media platform interface 201 may be utilized by an application 109 to receive event information from the media platform 103. In certain embodiments, the event information includes a determination that an event 111 is occurring, an extent of the event 111, a face of the event 111, a structure of the event 111, a type of the event 111, or a combination thereof. In certain embodiments, the face of the event 111 is the direction of a focus point of the event 111 points towards (e.g., a front stage at a concert). As such, the face of the event 111 may be the outward presentation of the event that the UEs 101 capture media regarding the event from. The location module 203, magnetometer module 205, accelerometer module 207, and media module 211 may be utilized to create context vectors to transmit to the media platform 103.

Moreover, in certain embodiments, UEs 101 may additionally communicate with other UEs 101 and devices via the communication interface 217. In these scenarios, information may be transmitted between UEs 101 via a peer-to-peer network topology. The UE 101 may communicate with other UEs 101 utilizing an application 109 based on proximity to the other UEs 101 (e.g., via a Near Field Communication (NFC) connection). In certain embodiments, NFC technology is a short-range technology that enables two-way interactions between devices. NFC technology can be used to communicate with smartcards, readers, and other NFC devices (e.g., another UE 101). NFC can utilize a magnetic field induction (e.g., using antennas) to communicate with other NFC devices that are located within a certain distance. For example, NFC device can transmit on a radio band (e.g., the radio band of 13.56 MHz). In another embodiment, a first UE 101*b* may utilize a second UE 101*a* as a conduit to communicate with the media platform 103. In this scenario, the second UE 101*a* may collect information (e.g., context vectors and/or media) from the first UE 101*b* and upload the information to the media platform 103. This may be useful when there is a crowd of UEs 101 (which may regularly occur during an event) and the network is a bottleneck or congested because of the crowd.

In one embodiment, the location module 203 can determine a user's location. The user's location can be determined by a triangulation system such as a GPS, assisted GPS (A-GPS) A-GPS, Cell of Origin, wireless local area network triangulation, or other location extrapolation technologies. Standard GPS and A-GPS systems can use satellites to pinpoint the location (e.g., longitude, latitude, and altitude) of the UE 101. A Cell of Origin system can be used to determine the cellular tower that a cellular UE 101 is synchronized with. This information provides a coarse location of the UE 101 because the cellular tower can have a unique cellular identifier (cell-ID) that can be geographically mapped. The location module 203 may also utilize multiple technologies to detect the location of the UE 101. GPS coordinates can provide finer detail as to the location of the UE 101. The location module 203 may be utilized by the application 109 to capture location information as part of a context vector to transmit to the media platform 103.

The range module 204 can include one or more sensors that sense the range of an object. For example, an infrared sensor, a radio sensor, a sonic sensor, a laser, a LIDAR (Light Detection and Ranging), a radar, etc. can be utilized to determine a range between the UE 101 and an object. The range detection can further be guided to determine how far an object centered by the UE 101 is. The range module 204 can thus detect what is in view and whether the view includes one or more obstructions to an event 111. Range detection is further detailed in FIG. 7B.

The magnetometer module 205 can include an instrument that can measure the strength and/or direction of a magnetic field. Using the same approach as a compass, the magnetometer is capable of determining the direction of a UE 101 using the magnetic field of the Earth. The front of a media capture device (e.g., a camera module 210) can be marked as a reference point in determining direction. Thus, if the magnetic field points north compared to the reference point, the angle the UE 101 reference point is from the magnetic field is known. Simple calculations can be made to determine the direction of the UE 101. In one embodiment, horizontal directional data obtained from a magnetometer is stored in a context vector when media is captured. This directional information may be correlated with the location information of the UE 101 and other UEs 101 to determine a focus point (e.g., where multiple vectors associated with the determined locations cross paths) for the event 111.

Further, the accelerometer module 207 may include an instrument that can measure acceleration. Using a three-axis accelerometer, with axes X, Y, and Z, provides the acceleration in three directions with known angles. Once again, the front of a media capture device can be marked as a reference point in determining direction. Because the acceleration due to gravity is known, when a UE 101 is stationary, the accelerometer module 207 can determine the angle the UE 101 is pointed as compared to Earth's gravity. In one embodiment, vertical directional data obtained from an accelerometer is stored in the context vector when media is captured.

Moreover, the altimeter module 209 may be utilized to determine the altitude of the UE 101 during the event. Altitude information may be included in the event vector to determine a vantage of the user while capturing media. Moreover, altitude information may be used to determine events happening at a single longitude and latitude location, but at a different elevation (e.g., on a roof of a building, edge of a cliff, etc.). In certain embodiments, the altimeter module 209 includes a pressure altimeter that determines barometric pressure to determine the altitude. In another embodiment, the UE 101 may include a temperature sensor that is used to infer altitude based on the ambient temperature (e.g., temperature decreases at known rate with increasing altitude). In addition or alternatively, GPS information may be utilized to determine altitude information.

Media can be captured using a media capture device associated with the media module 211. A media capture device may include a camera module 210, an audio recorder, a video camera, a combination thereof, etc. In one embodiment, visual media is captured in the form of an image or a series of images. The media module 211 can obtain the image from a camera and embed the image within an event vector also containing location data, timing data, and orientation data. Moreover, the event vector may additionally include air-pressure sensor data, temperature sensor data, other such sensor data, or a combination thereof. Timing information can be synchronized between UEs 101 utilizing one or more services. In certain embodiments, the UEs 101 include a cellular radio. The cellular radio can be utilized to synchronize the UE 101 to a particular time associated with a wireless carrier. Carrier information can be included as metadata because different carriers can include different timing clocks. As such, the timing information can be synchronized based on carrier. Additionally, one or more offsets can be determined between UEs 101 associated with different carriers. Further, content processing (e.g., audio processing) may be utilized to synchronize timing of associated media items.

Information that is collected to transmit to the media platform 103 may be controlled and viewed using the user interface 215, which can include various methods of communication. For example, the user interface 215 can have outputs including a visual component (e.g., a screen), an audio component (e.g., a verbal instructions), a physical component (e.g., vibrations), and other methods of communication. User inputs can include a touch-screen interface, microphone, camera, a scroll-and-click interface, a button interface, etc. Further, the user may input a request to start an application 109 and utilize the user interface 215 while capturing media. Additionally or alternatively, the UE 101 may include an application 109 that can be presented using the user interface 215. Utilizing the user interface 215, the user may select to view one or more views of the event 111 and/or request that events nearby the user be presented to the user. Further, the user may, while capturing media items, receive output describing where to focus and/or other guidance information.

Additionally, the user interface 215 can be utilized to present compilations of media items. For example, the runtime module 213 can request the compilation from the media platform via the media platform interface 201. The runtime module 213 can then receive the compilation (e.g., via download or a stream) and present the content via the user interface 215. In certain embodiments, the user can enter parameters for determining criteria to control the user experience of the compilation via the user interface 215. This criteria and/or parameters for determining the criteria can be sent to the media platform 103. The media platform 103 can process the compilation according to the criteria and send the compilation. The runtime module 213 can then receive the compilation and present it via the user interface 215. The compilation can be made dynamically according to one or more interactive responses.

Figure 3:
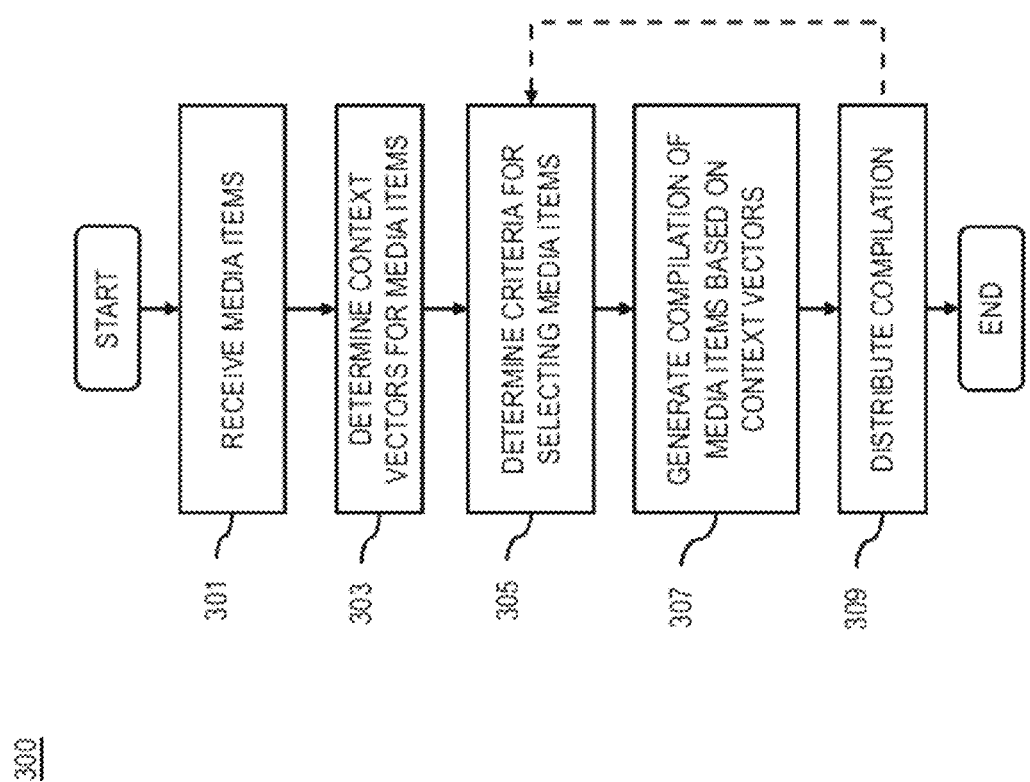
FIG. 3 is a flowchart of a process for generating a compilation of media items, according to one embodiment.
Figure 11:
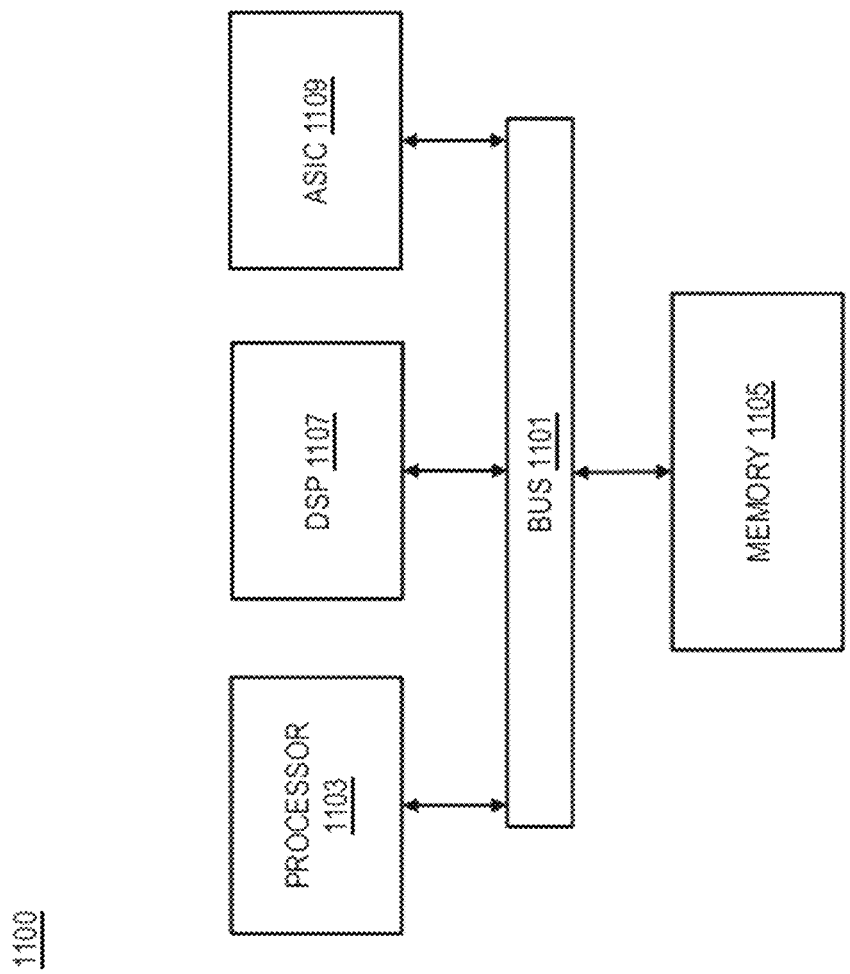
FIG. 11 is a diagram of a chip set that can be used to implement an embodiment of the invention.

FIG. 3 is a flowchart of a process for generating a compilation of media items, according to one embodiment. In one embodiment, control logic of the media platform 103 performs the process 300 and is implemented in, for instance, a chip set including a processor and a memory as shown in FIG. 11. Additionally or alternatively, one or more portions of the process 300 can be implemented via another device (e.g., the UE 101). As such, control logic of the media platform 103 and/or other devices can be utilized to implement one or more steps of the process 300.

At step 301, the control logic of the media platform 103 receives a plurality of media items. These media items can be utilized for generating a compilation media item (e.g., a director's cut compilation). Further, these media items can be stored in the media data database 115 of the media platform 103. The media items can be in the form of one or more video items, audio items, image items, etc. For example, the media items can be streamed to the media platform 103 and/or sent as a file, e.g., in Moving Picture Experts Group (MPEG) format, Windows® media formats (e.g., Windows® Media Video (WMV)), Audio Video Interleave (AVI) format, as well as new and/or proprietary formats. In certain embodiments, these media items can additionally include associated context vectors as part of the media items, as metadata in the media items, or as a separate file associated with the media items.

The media platform 103 determines respective context vectors associated with the media items (step 303). The context vectors can include orientation information, geo-location information, timing information, a combination thereof, and can be associated with the creation of the respective media items. For example, the context vector associated with a frame of a video can include the time the frame was captured as well as the location the UE 101 capturing the media item was. Moreover, as noted above, the context vector may include accelerometer data, magnetometer data, altimeter data, zoom level data, focal length data, field of view data, or combinations thereof. The media platform 103 can determine the context vectors by using one or more identifiers linking the media items to respective context vectors, extracting the context vectors from the media items, or the like.

At step 305, the media platform 103 determines one or more criteria, user preferences, or a combination thereof for selecting from among the media items to include in a compilation. This step can occur multiple times as one or more criteria can be updated (e.g., based on user input, change in a service performed by the media platform 103, etc.). The criteria can include one or more specifications and/or filters associated with the context vectors and/or media items. For example, one criterion may include a preference or threshold as to what quality media item to include in the compilation (e.g., a resolution for a video file). Another criterion can be to utilize an advantageous view in the compilation. This can be based on a determined face(s) of an event associated with the context vectors. The determination of the faces is further detailed in FIGS. 7A-7C. One such advantageous criterion includes a determination that the media item is capturing the event from an elevated location. Another criterion includes a determination that the media item has an unobstructed view of the event. As such, the criteria can include one or more rules specifying a beneficial range of one or more parameters in a context vector. Additionally, these criteria can be determined based on one or more algorithms associated with determining views based on multiple UEs 101 capturing media items during an event. For example, in one scenario, the criteria include parameters associated with panning of a UE 101 while capturing an associated media item. For example, it may be undesirable to watch a media item with a large amount of minor panning, but it may be desirable to watch media items that change focus to a particular sub-event occurring during an event. As noted above, the panning can be detected via the context vectors (e.g., based on the magnetometer module 205 and/or accelerometer module 207). The associated magnetometer information and/or accelerometer information can be analyzed for detecting the panning. One or more panning events can be detected from the context vectors (e.g., based on criteria and/or patterns).

Moreover, the criteria can be changed based on user input. For example, if a user is viewing the compilation, the viewer may be provided one or more options to specify criteria. In this example, the compilation can be augmented based on the specified criteria. In one scenario, the user is provided the compilation on a touch screen device. The user may input additional criteria using the touch screen. For example, if the user is interested in a particular view of the event from another angle, this can be selected as criteria. Additionally or alternatively, the user may be provided arrows for specifying criteria that the user is interested in those views. When selected, the preference can be added as criteria. As such, if a media item includes such a view, the media item will receive preference for viewing. If no such media items exist, then the closest view and/or angle to the selection can receive preference for viewing.

In certain embodiments, the criteria can be utilized to determine a score to decide what segment from what media item to incorporate in a compilation. The scoring mechanism can be based on corresponding segments of media items and is further detailed in FIGS. 4 and 8.

At step 307, the media platform 103 generates a compilation of at least a portion of the media items based, at least in part, on the context vectors. For example, multiple media items can be selected for incorporation in the compilation based on the one or more criteria. The incorporation can be further based on one or more events, sub-events, and/or focal points (e.g., regions of interest) of the media items based, at least in part, on the respective context vectors. In one example, a sub-event can be detected based on a detected panning and/or focus change in one or more media items associated with an event. When this occurs, the compilation can include a view from a media item focused on the sub-event. In another example, the compilation can be based, at least in part, on a viewing of one media item. Additionally or alternatively, one or more media items can be incorporated at the same time. For example, multiple views can be incorporated in the compilation for the same time segment. In this manner, a view focused on a sub-event can be presented simultaneously with a view focused on another portion of the event. The compilation incorporation is further detailed in FIGS. 4 and 8.

The media platform 103 distributes the compilation of media items (step 309). In certain scenarios, the distribution is determined by the control logic to be provided via a web portal. For example, the media platform 103 may host a web page and/or may determine to post the media items and/or compilation on another web portal (e.g., via a social networking hosting site). Further, the compilation can be based, at least in part, on a media item that a user is viewing.

For example, the user of a UE 101 selects a media item to view. The media platform 103 presents the media item and generates a director's cut based, at least in part, on the media item. This director's cut can be presented to the user as a selectable option. As such, the media platform 103 searches a context data database 113 for media items that include context vectors associated with an event associated with the presented media item. The director's cut can then select criteria based, at least in part, on the media item (step 305) and generate the compilation (step 307). Then, the compilation can be transmitted to a UE 101 of the user for presentation (step 309). This compilation can be presented as a stream and/or media files. As previously noted, the user can be presented with one or more options to modify the compilation (e.g., by selecting additional criteria). In certain scenarios, the media items can have associated user ratings (e.g., a score). These scores may additionally be utilized in determining which media items to utilize in the compilation (e.g., the best scores can be weighted with a preference for being included in the compilation).

Figure 4:
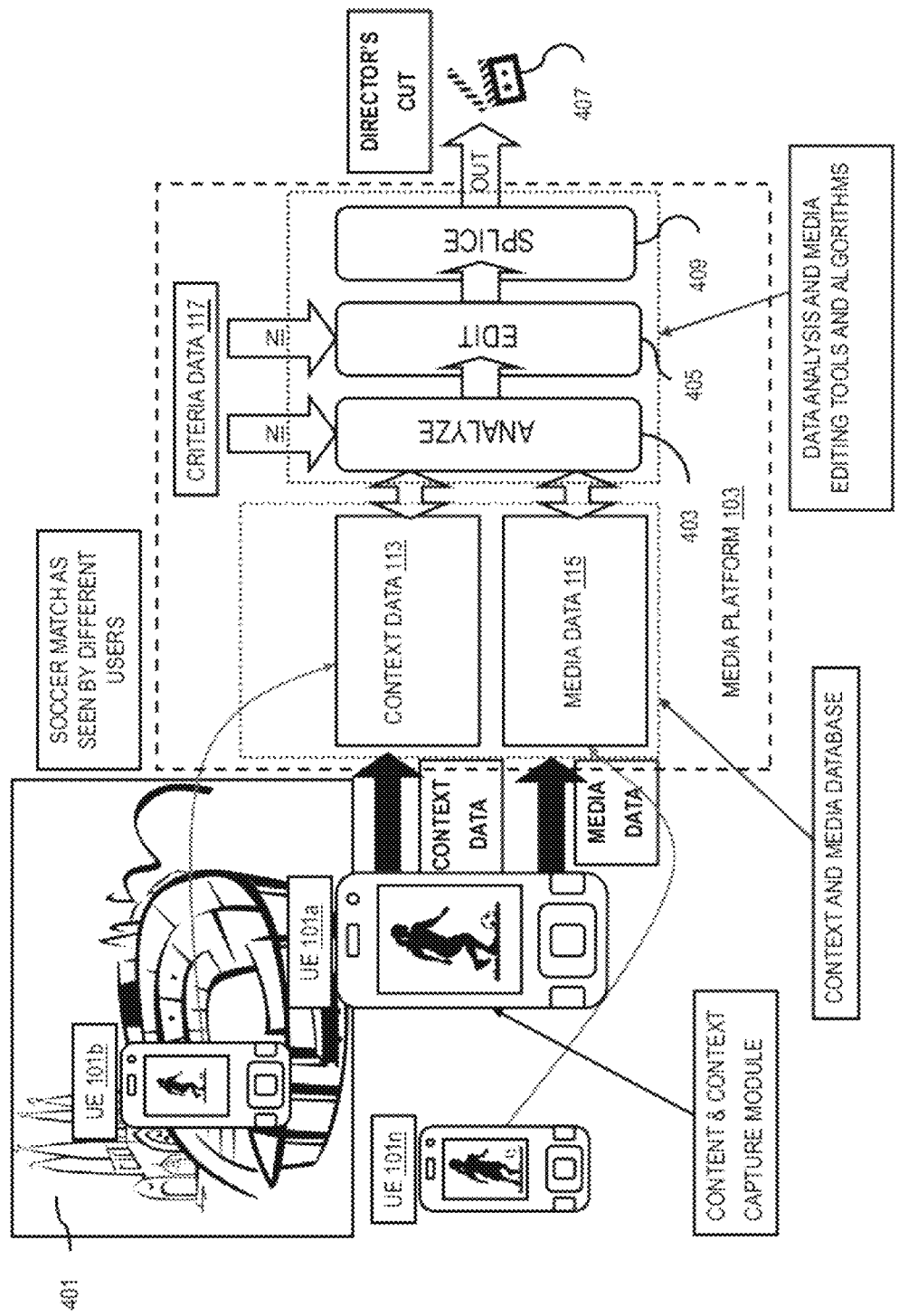
FIG. 4 is a diagram of utilizing a media platform to generate a compilation of media items, according to one embodiment.

FIG. 4 is a diagram of utilizing a media platform to generate a compilation of media items, according to one embodiment. In this embodiment, users utilize UEs 101a-101n at an event 401 (e.g., a soccer event). At the event, media items as well as associated context vectors are sent from the UEs 101 to the media platform 103. The media platform 103 can store this information in the context data database 113 and/or media data database 115. In certain embodiments, the context data database 113 can be populated utilizing one or more scripts to import serialized context data. The serialization helps facilitate access of the context vectors.

During the event 401, or at a later time, the media platform 103 can output a compilation (e.g., a director's cut) based on the context vectors, media items, and criteria stored in a criteria data database 117. As previously noted, sensor data can be stored as context vectors and may be stored in any format, such as RDF/XML files, similar suitable formats, or proprietary formats. The UE 101 clock can be synchronized with a common shared clock between all of the UEs 101 recording content that is used for automatic video editing at the media platform 103. The common shared clock may be a GPS clock, wall clock time, or any suitable clock that is accurate and stable. For example, a cellular UE 101 can be synchronized based on a network clock. Also, a software implementation may record accurate timestamps for each sensor data reading in order to correctly interpret the actions of the content capturer (e.g., panning, tilt, etc.). The sensor data from the compass, accelerometer, altimeter, etc. can be transferred either in real-time, in a non real-time fashion, or at any convenient time to the media platform 103 along with the captured media items.

The media platform 103 can analyze 403 the media items and context data to determine one or more events associated with media items (e.g., a determination that the UEs 101 are at the event 401). This may be based on timing information as well as orientation information, geo-location information, and view focus determinations. One or more data analysis 403 and media editing 405 tools can be utilized in determining the output compilation 407. Once various segments from media items are selected during the editing process 405, the media items are spliced 409 together to generate the compilation. The analysis, editing, and splicing are further detailed in FIG. 8.

Figure 5:
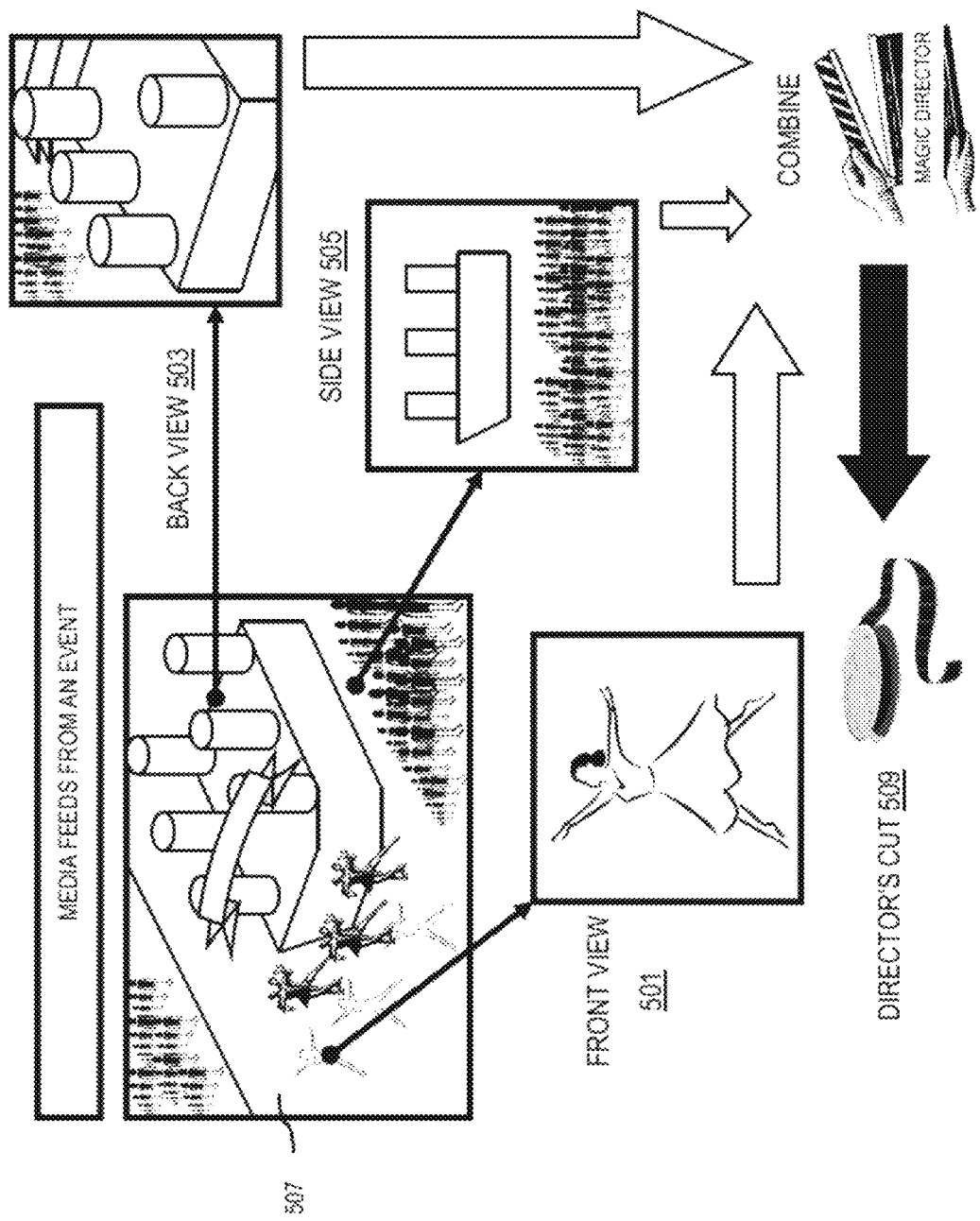
FIG. 5 is a diagram of views of media items collected by user equipment utilized to generate a compilation, according to one embodiment.

FIG. 5 is a diagram of views of media items collected by user equipment utilized to generate a compilation, according to one embodiment. According to this embodiment, various UEs 101 capture media items and context vectors associated with various views 501, 503, 505 of an event 507. As noted above, the timing information associated with the UEs 101 can be synchronized. As such, it can be determined that one or more of the views 501, 503, 505 occur at the same time. These views 501, 503, 505 can be determined to be associated with one or more perspectives of the event 507. Further, the views 501, 503, 505 can be utilized in generating a director's cut compilation 509. In certain embodiments, the compilation 509 may include more than one view in a frame (e.g., creating a 360 degree angle of viewing by including more than one view 501, 503, 505). Additionally or alternatively, one or more views may be filtered out based on one or more criteria. For example, the primary event may be determined to be associated with the front view 501 (e.g., because more media items are associated with the front view), while some UE context vectors were associated with the side view 505, and even less with the back view 503. As such, the compilation 509 can include these views proportionally or with respect to criteria.

Figure 6:
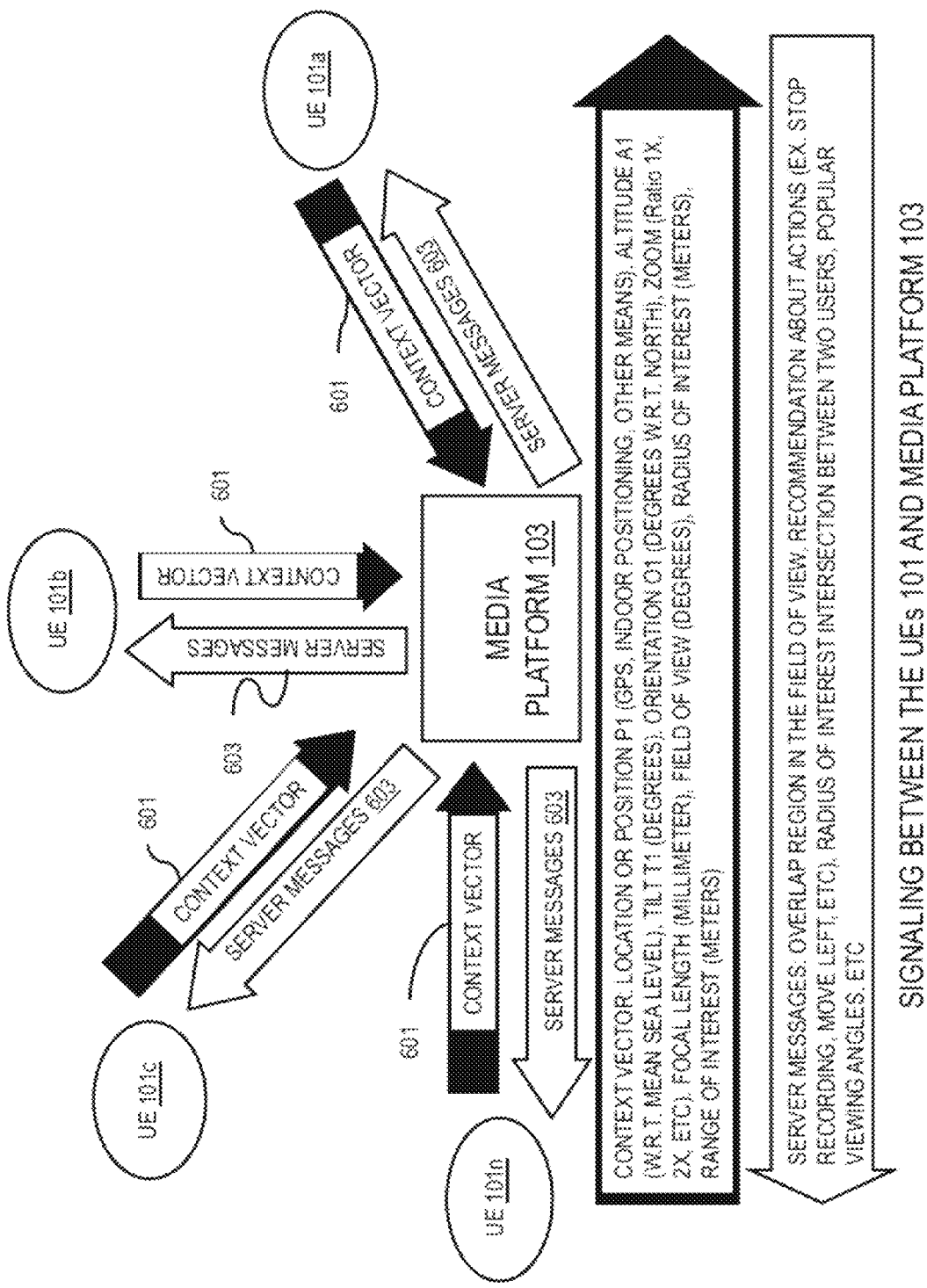
FIG. 6 is a diagram of signaling between user equipment and a media platform for generating a compilation, according to one embodiment.

FIG. 6 is a diagram of signaling between user equipment and a media platform for generating a compilation, according to one embodiment. During the course of an event, the media platform 103 and/or another platform can be utilized to provide guidance to UEs 101 for collecting media. As such, the UEs 101 can be associated with a service and/or application for collaboratively collecting media. Thus, signaling can be utilized in informing UEs 101 of guidance. Signaling can occur in real-time during the occurrence of an event. As such, the media platform 103 can collect and store context vectors 601 associated with the event. Further, the media platform 103 can analyze the context vectors to determine one or more characteristics associated with captured media items. These characteristics can be utilized to determine one or more deficiencies in media items or improvements that can be made in media collection. With this approach, the media platform 103 can determine one or more messages to direct capturing of media items based on the characteristics. Characteristics can be based on one or more parameters (e.g., one or more context vector parameters). Additionally or alternatively, the characteristics can be based on analysis of context vectors. For example, characteristics can include determinations of whether a particular view of the event is missing, can be improved (e.g., by increasing the altitude of the UE 101 capturing the media), or whether multiple users have overlapping media item creation and it could be advantageous to move one or the users to another angle. Corresponding instructions can be generated at the media platform 103 and sent to UEs 101 via server messages 603. These messages can be processed, rendered, and presented to users of the UEs 101.

One advantage of utilizing such messages is to support cooperation between users of UEs 101 to provide for a better compilation. Thus, the media platform 103 can determine whether two (or more) users that are recording the event by pointing their recording UEs 101 (i.e., cameras) in directions that intersect are actually capturing the same scene or different scenes. In this manner, it is possible to determine if there is an overlap in the captured area between the two users.

Further, the messages can be utilized for maximizing the recorded area of the event. Each user may choose not to capture an area of the stage or event that is already being covered by other users, and focus on another area, thus maximizing the number of available views of that event (e.g., in case something unexpected or significant occurs). A possible variant of this concept would include making each user aware of the areas that are not being covered by others. As such, the messages 603 can provide information about deficiencies in coverage and/or instructions to follow (e.g., move left and point up or provide a view using a corresponding viewfinder).

Moreover, according to the system 100, each user could be able to receive information regarding from which angle a specific area is being captured by other users (i.e., which viewpoint the other users have). Thus, users may decide to capture the same area already being covered by others, but from a different viewpoint. As noted previously, explicit instructions may additionally be provided.

Figure 7C:
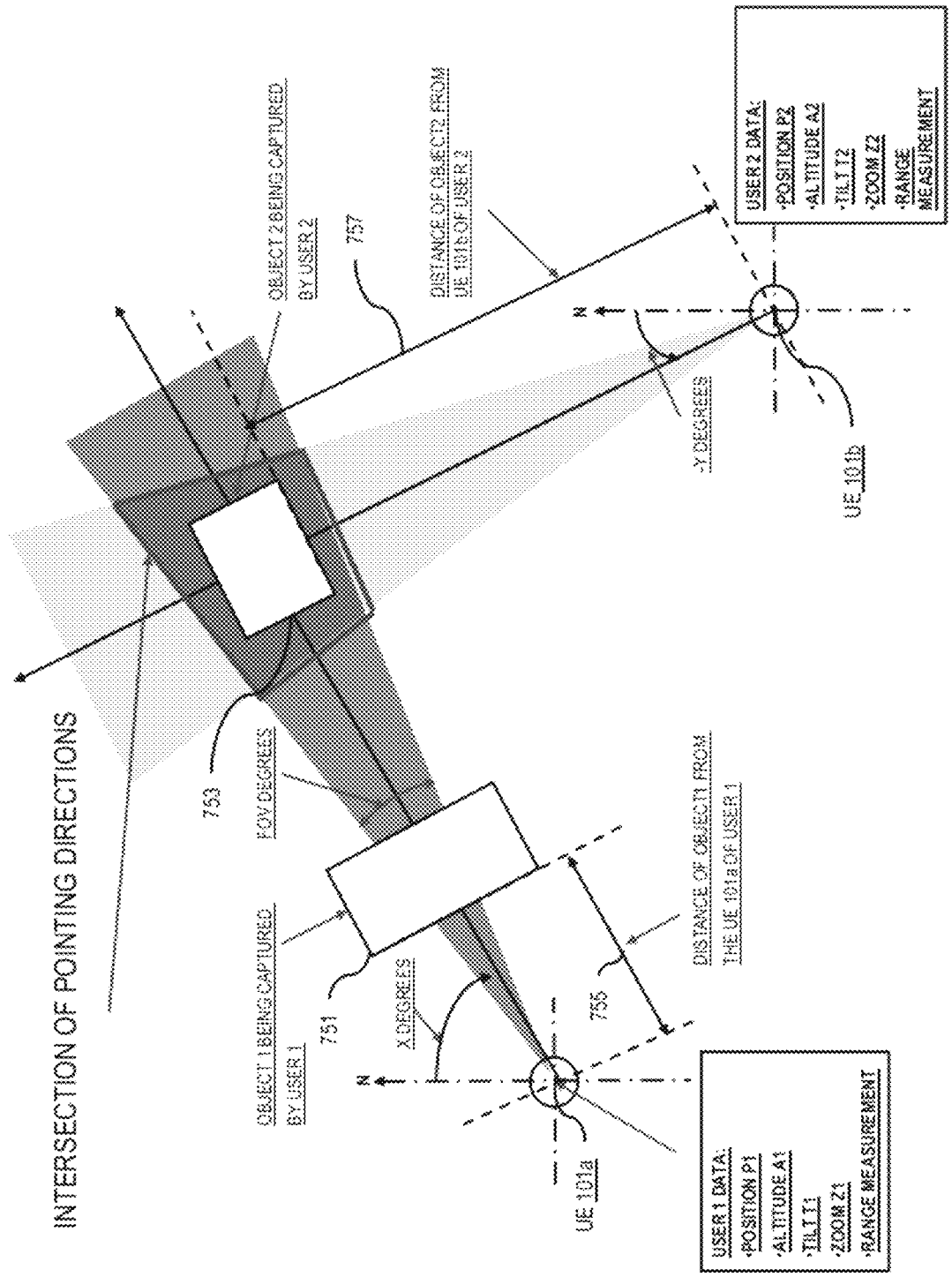

If, media platform 103, generating the automatic compilation of the event deduces that two users are recording different scenes, then the compilation creation system may decide whether to use both or only one of these two content versions. This determination can be based on preferences or criteria for generating the compilation or video summary (e.g., visualizing the highest number of views of different areas in the event, visualizing the highest number of view-points with different angle of the same scene in the event). Range information, as further described in FIGS. 7a-7C is useful for deducing overlaps in the captured view as well as for understanding whether a user is capturing something that is relatively close or far from the user. In fact, based on statistics (e.g., number of users pointing to a certain location of the whole event area for the most of the time) and on metadata (context vectors), the media platform 103 can use range information for understanding whether the user is pointing at something that is not the main interest point of the event. For example, the user may be pointing at a friend who happens to be closer to the UE 101 compared to the main interest point (e.g., a music performance stage at a concert event). Using this information, the media platform 103 may decide to use that particular view only for a short time interval or not at all.

The media platform 103 can use the context vectors associated with multiple UEs 101 to determine the overlap of view between respective users of the UEs 101. Depending on context vectors captured by the devices and the analysis by the media platform 103, the users can get recommendation messages about the overlapping region mentioning parameters such as the accuracy of the determined overlap region, the viewing context of other users, etc. The media platform may also use the captured content data to decide on a radius of interest and/or range of interest for a particular user or a set of users. The radius of interest and the range of interest are useful in defining at what distance from the user position it would be useful to know about an overlap between multiple users.

Using the compass orientation, location (GPS or indoor position), tilt angle, altitude, it is possible to determine the viewing axis of the user. Using the zoom, focal length, field of view it is possible to estimate the view cone for each user. Collating the view cones of multiple users and using the Radius of Interest for each device (e.g., using the ranging sensor) enables the media platform 103 to determine the intersection planes between users. This intersection volume determines the overlapping region between the users. Using the individual Radius of Interest of each device, the service can calculate the expected radius of interest for the event from locations where there are no users currently. If the overlapping region coincides with the radius of interest and within range of interest (e.g., a range of 10 m at a distance of 20 m from the users), the user can be notified that an overlap exists for the user's view of recorded content. The user can then either choose to modify the user's viewing angle to better cover the event or concert with a non-overlapping view or even choose to ignore the recommendation.

A focal length can also be used to determine if a user in a certain position is actually recording the common content of interest (e.g., the stage in case of a concert) or some object right in front of him (e.g., his friend). If an object of interest for a certain user is determined as "out of range" of another user's radius of interest, the other user need not be informed about potential overlap even if the user's viewing angle, location, etc. might indicate a potential overlap. By using these techniques, it can be possible to minimize false detections of overlaps between users.

Further, these server messages 603 can help the user make a more informed decision about how to capture the user's media items in a manner that can maximize the gain when the content from the multiple sources is combined. Thus, these server messages 603, in addition to providing information for maximal coverage of the event, may also provide information to the users about the redundancy of recorded content between different recorded media items.

The context vector signaled by the devices to the server can be sent over Hypertext Transfer Protocol (HTTP), Session Initiation Protocol (SIP), Real Time Streaming Protocol (RTSP), any other suitable transport mechanism. The context vector information may be transported as a Session Description Protocol (SDP)/XML/binary or any other suitable format. The signaling messages 603 from the media platform 103 can also be transported over HTTP/SIP/RTSP, included in SDP/XML/binary, or any such suitable format.

FIGS. 7A-7C are map diagrams displaying example maps of locations utilized to generate context vector information, according to various embodiments. The determination of the focal point may be further described utilizing the map 700 of FIG. 7A. The map 700 displays multiple users 701, 703, 705 utilizing UEs 101 to transmit event information to the media platform 103. Magnetometer information may be utilized to determine an angle with respect to north. This angle can be utilized to determine vectors 707, 709, 711 pointing towards a location that the user is interested in capturing media about from the user's location 701, 703, 705. The user's location 701, 703, 705 may be stored and utilized using latitude and longitude information and/or other location coordinate information (e.g., GPS coordinates). The vectors 707, 709, 711 may be analyzed to determine one or more intersection points, which may be considered a focal point 713. In certain embodiments, there may be more than one focal point 713 associated with a determined event. Further, the location information may include an altitude and the accelerometer data may be utilized to add a three dimensional component to the focal point 713. With this data, the vectors may be analyzed in a three dimensional space. Further, coarse determinations may be made with regard to the accelerometer data (e.g., whether each user has a lower vantage point or a higher vantage point in relation to the focal point 713).

Further, an area of extent associated with the event may be determined. A perimeter may be determined using orthogonal boundary lines 715, 717, 719. These lines may be orthogonal to the determined vectors 707, 709, 711. Moreover, if there are gaps in the perimeter, the focal point 713 may be utilized to determine the boundary. In other embodiments, the area of extent may be determined to be an area based on a radius from the focal point 713 to the furthest user. Additionally, the structure of the event may be determined based on the focal point and the area of extent. For instance, if the focal point 713 is in the sky, it may be determined that the structure of the event is a sky event. Moreover, if the focal point 713 is only captured from a particular side, it can be determined that the event faces a certain direction from the focal point 713 (e.g., the event faces south west from the focal point 713). This structural information may be used to determine a type of event associated with the event. In this manner, the structure of the event may be determined to be a stage facing the determined direction, a sky event, a stadium event (if it is determined that the UEs 101 have a higher vantage point than the focal point 713), a building event (e.g., if the UEs 101 are within a building) etc. When the focal point 713 is determined and area of extent is determined, the area of extent may be associated with a map. This map may be utilized to disseminate information about events to the users of the media platform 103 (e.g., using messages described in FIG. 6).

FIG. 7B is an example map diagram displaying a map of locations utilized to generate context vector information, according to one embodiment. This map more particularly points out a radius of interest 731, 733 of users capturing media items using UEs 101. These ranges of interest can be utilized in determination of context data. Further, as noted above, UEs 101 can capture media as well as context vector information 735. Moreover, as described in FIG. 6, a real-time communication sub-system can be utilized to receive instructions or guidance from the media platform 103, which can coordinate between multiple UEs 101.

As such, users are made aware of already covered areas of the event. By having a real-time bi-directional channel between each user's UE 101 and the media platform 103 (e.g., via cellular radio network, WLAN, or other networking technologies), one or more UEs 101 can continuously send both location data and compass data, as well as other context vector information (e.g., in RDF/XML format), at a given rate to the media platform 103. The media platform 103 can then send back to each UE 101 information about areas already being covered by the other users. Then, each user can be presented on his/her viewfinder a rectangle (or other form of visual representation) that highlights the already covered area (if it lies inside the currently captured area of that user). A different viewfinder view would display the negative view, i.e., the areas of the event that have not been covered by any user recorded video.

The angle from which the already covered areas are being captured by the other users may additionally be displayed by modifying the shape of the rectangle accordingly, by drawing an arrow that would represent the pointing direction (e.g., as shown in FIG. 9A).

To determine an overlapping region 737 (e.g., focus point) in the viewfinders of two or more UEs 101, context data from the range sensor can be used to generate information about the overlapping view more accurately. The data that may be recorded by each UE 101 that is recording media items. Moreover, each of the UEs 101 can be associated with a radius of interest based on the range sensor. The range of interest and/or zoom level of the UEs 101 with respect to the overlapping region 737 can be utilized as parameters to determine a media compilation based on criteria associated with such a range and/or zoom level. For example, it may be advantageous, in certain circumstances, to get a more enlarged view of the focus region (e.g., during a concert) or a broader view of the focus region (e.g., during fireworks).

Each of the recording UEs 101 can then display rectangle-like window(s) on the viewfinder for making the user aware of the areas that are recorded by other users. This can enable cooperation in event recording. If the transmission of the information about the common covered areas does not happen in real time to the several users, this information can be used later by the server to determine what viewpoint(s) to use in a video summary or compilation.

FIG. 7C additionally points out another use of the range sensor. The range module 204 can be utilized to determine whether an object 751 is obstructing a view of a UE 101a from a focus point 753. Because the range 755 of the first UE 101 from the focus of the UE 101a is smaller than the distance to the focus point 753 (e.g., based on one or more other UEs 101 and/or ranges (e.g., range 757) associated with the other UEs 101), it can be determined that UEs 101a and 101b are associated with different scenes. In certain scenarios, based on one or more criteria, the obstructing object 751 can be included in the compilation and/or removed from the compilation. Such criteria can include a determination of whether the UE 101a is even associated with the same event and/or if other UEs (not shown) are also focused towards the object 751. In certain scenarios, the event type may be utilized to determine the criteria. For example, in a concert with multiple focuses and/or stages, it may be more likely that the object 751 includes information that users may wish to include in a director's cut compilation.

Further, panning may be a focus of certain criteria. Panning operations can, in certain embodiments, be classified as intentional or non-intentional for being utilized for selection criteria to incorporate a segment associated with the panning in a compilation. This can be done by determining the frequency of one or more panning events, the speed of each panning operation, the actual orientation values (e.g., from which the direction of each panning can be deduced—clockwise or counterclockwise) of panning operations. For example, if the system 100 detects at a close range 755 a series of fast panning operations over a narrow angle, which happen with high frequency and alternately in opposite directions, then those panning events may be classified as non-intentional because most likely the operations are due to horizontal camera shaking. In another example, if the user has not zoomed in and the scene being captured is not very close to the UE 101 (e.g., at a longer range 757), a panning operation over a small angle does not change the viewing angle of the scene greatly, thus it can be classified as non-intentional and then ignored during the media editing.

An intentional panning event detected on one of the UEs 101 can signify that a new view of the scene is available and therefore an automatic video editing process may include the video segment recorded by that UE 101 just after the panning event has completed. This may additionally be based on one or more criteria and/or whether or not one or more other users focus on the new focus point. Thus, the detected intentional panning events can be used as event points for switching camera views. Use of event points is further detailed in FIG. 8. Moreover, other classifications of panning events can be made and utilized for detecting event points and/or selection of media segments for inclusion in a media compilation.

Another classification of panning events is based on the speed of the panning operation by using the orientation values and the associated timestamps. In this manner, panning events can be classified into different categories according to different speeds (e.g. multiple speed categories). Furthermore, these speed categories can be associated to semantically meaningful classes. For example a panning operation that is slow and that covers a wide angle can be associated to the class "panoramic panning," a rapid change in the viewing angle can be associated to the class "rapid change of the main focus," or the like. The obtained classes can then be used by an automatic video editing algorithm for deciding what type (e.g., in terms of speed) of panning operation to include into the final director's cut, based on different policies (e.g. user preferences, criteria, rules, etc.).

The classification of intentional vs. non-intentional panning and the classification into semantically meaningful panning classes can be reinforced by exploiting the availability of multiple UEs 101 that are recording the same event, for example, by looking for a correlation of one or more characteristics of the panning operations made by different users. Regarding the intentional vs. non-intentional classification, if for many of the participating users the system detects a panning operation within a certain time interval (e.g., almost simultaneously), then it can mean that the panning operation made by these users are most likely intentional (e.g., a sub-event or change in focus to a different aspect of a performance). Regarding the classification into semantically meaningful panning classes, the availability of information about the frequency, speed, timing, and orientation values of the panning operations of multiple users can help to better understand what type of panning each user is doing from a semantic point of view. If only one user in a certain time interval is doing a slow and wide panning, then that user is most likely doing a panoramic panning. Instead, if many of the users are doing a slow and wide panning operation within a similar time interval, then it could mean that the users are attempting to follow and capture something that is slowly moving.

Another classification of panning events is based on the orientation with respect to magnetic north of the image capture device of a UE 101 when panning has completed. According to this classification, panning events can be marked either as inside or outside the region of interest. The region of interest can be determined either according to end-user preferences or automatically by looking at the statistics in the orientations recorded by media items associated with the event. For example, if most of the users are recording for the most of the time towards orientations between −30 degrees and +30 degrees, then the region of interest is set to be within this range. An automatic video editing algorithm may then choose not to include video segments recorded by UEs 101 just after panning operations have ended outside the region of interest. Additionally or alternatively, if it is determined that the focus of users has changed to that new area, the video editing algorithm may include the content.

Figure 8:
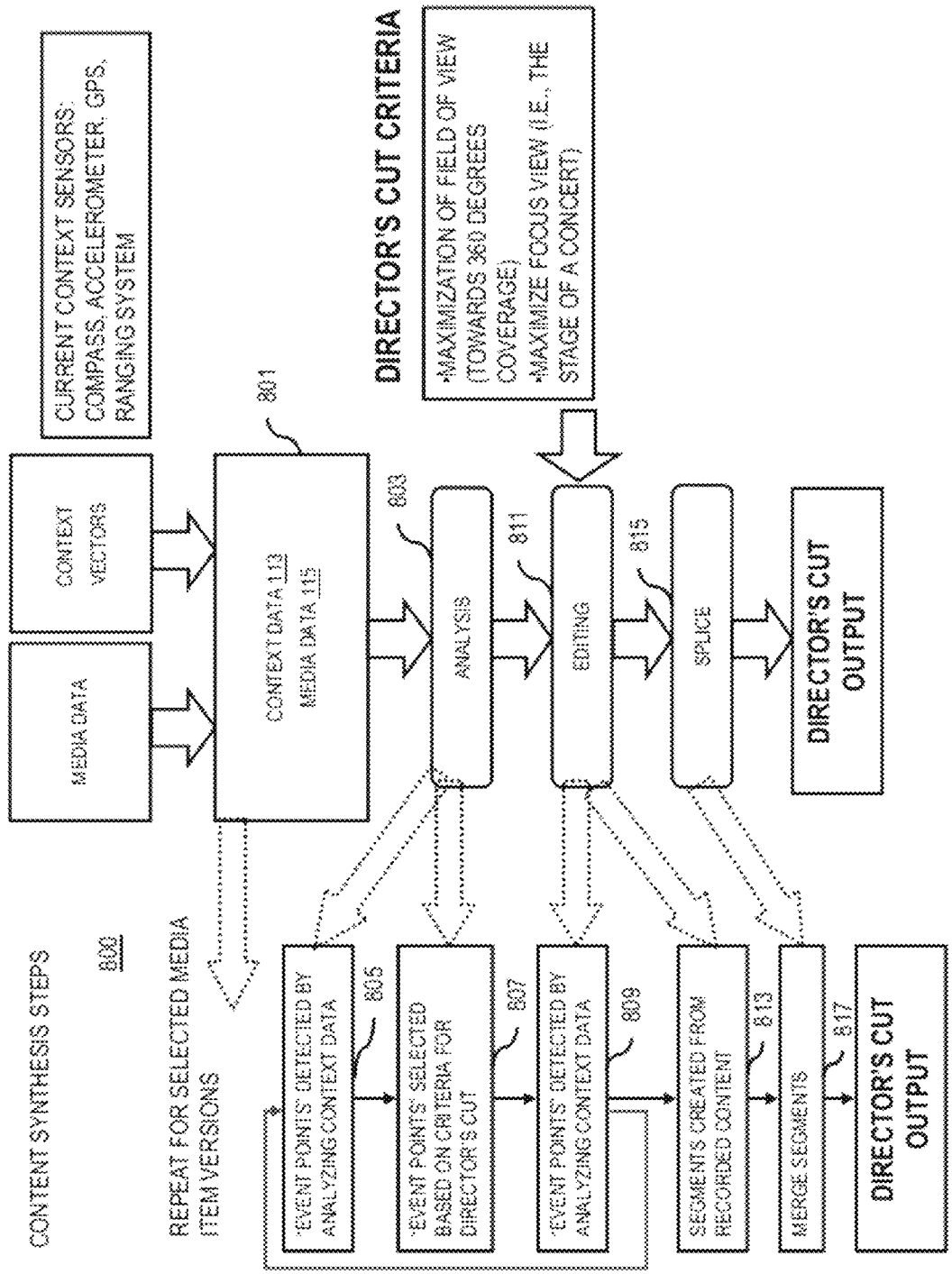
FIG. 8 is a flow diagram utilized in generating a compilation of media items, according to one embodiment.

FIG. 8 is a flow diagram utilized in generating a compilation of media items, according to one embodiment. In one embodiment, control logic of the media platform 103 performs the process 800 and is implemented in, for instance, a chip set including a processor and a memory as shown in FIG. 11. Additionally or alternatively, one or more portions of the process 300 can be implemented via another device (e.g., the UE 101 or an external server). As such, control logic of the media platform 103 and/or other devices can be utilized as means for implementing one or more steps of the process 800.

At step 801, the media platform 103 receives context vectors and media data. This information can be stored in the media data database 115 and/or context data database 113. The media platform 103 then performs an analysis (step 803) of the data. For each of the media items associated with the media data database 115 and/or context data database 113, the media platform 103 can detect event points by analyzing context vectors (step 805).

In certain embodiments, event points are sensor values of interest. These event points can occur when sensor values associated with context vector parameters meet certain criteria (steps 807). For example, when it is detected that more than one media item is focused on a certain area for certain duration of time, panning of multiple users changes to focus on a different point during the event, it is detected that a change in focus has occurred, etc. As such, event points can be detected by analyzing context vectors (step 809). During analysis, the captured context vectors corresponding to the individual media items for an event can be analyzed to generate the key event points along the duration of the content. An event point, in certain embodiments, is any change in recorded context vectors that corresponds to a noticeable change in the recorded content. This change could be related to the viewing angle of the content, stability of the camera when recording the content, a change in the viewing along to coincide with the change in position of the object, a region of interest that is being recorded (e.g., the performer on the stage in a concert), or the like.

Some "event points" are selected from a set of detected event points based on criteria used for generating a compilation. For example, the criterion can include that the compilation would include content only in a particular region (e.g., a region of +30 and −30 degrees with respect to Magnetic North). Panning actions can be first noted as event points for the particular content recording. In the another step, the event points that result in taking the orientation of the recording UE 101 out of the specified region are dropped or filtered out of being options for including in the compilation.

The event points can then be utilized to select corresponding segments during an editing process (step 811). During this process, segments between event points can be created for one or more media items (step 813). Then, segments can be selected for inclusion in a director's cut output compilation based on criteria.

The criteria can include one or more pre-determined profiles. For example, a profile can exist for maximizing the field of view (e.g., attempting to acquire 360 degree coverage during the compilation), for maximizing a focus view (e.g., a stage of a concert), etc. The focus view and/or field of view can be based on one or more context vectors (e.g., the focus can be determined based on a range of view of the body of information available.

Thus, if the criteria include a maximization of the field of view, preference is given towards including in the compilation segments that together provide a wide prospective. Additionally or alternatively, if the criteria include a specific orientation of interest, the segments can be selected based on a preference of view towards that orientation or focus. As previously mentioned, the criteria may additionally be based, at least in part, on the elevation or tilt of a UE 101. For example, vantage point for a concert may be important and a better view may be associated with a higher altitude.

Then, at step 815, the selected segments are spliced together. As such, the segments can be merged according to criteria (step 817). The merging can include one or more views of media items per frame or a single view per frame.

Figure 9B:
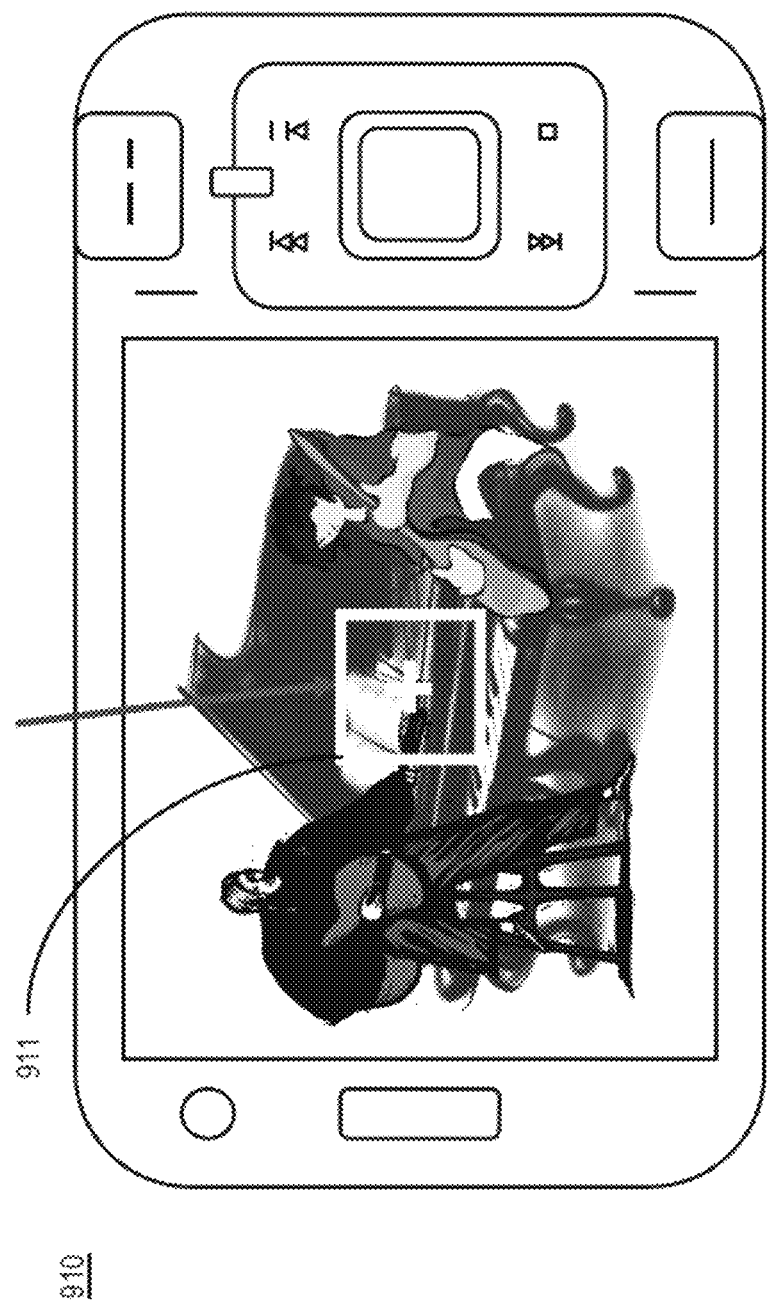

FIGS. 9A-9E are diagrams of user interfaces utilized in the processes of FIGS. 4 and 8, according to various embodiments. FIG. 9A shows a user interface 900 of a user that can be utilizing a service of the media platform 103 for indicating collaborative event media generation. Angles of the event that other users are covering can be shown to the user. As such, a rectangle 901 can be displayed indicating the area of the event covered by other users. Further, the arrow 903 can indicate a pointing direction that can be utilized to capture a more useful perspective.

FIGS. 9B and 9C show options on a user interface 910, 920 for presenting a focus of a captured media object on a viewfinder. These interface options can be presented while capturing media items. The focus 911 can be originally set based on a central position of the UE 101 and/or a range sensor 204 for determining a focus range. Then, the user can select a new focus 921. This can be accomplished on a touch-enabled device by, for example, touching the new focus area 921. As such, context vectors can indicate the focus area 921 being that particular location instead of the previous focus 923.

Figure 9D:
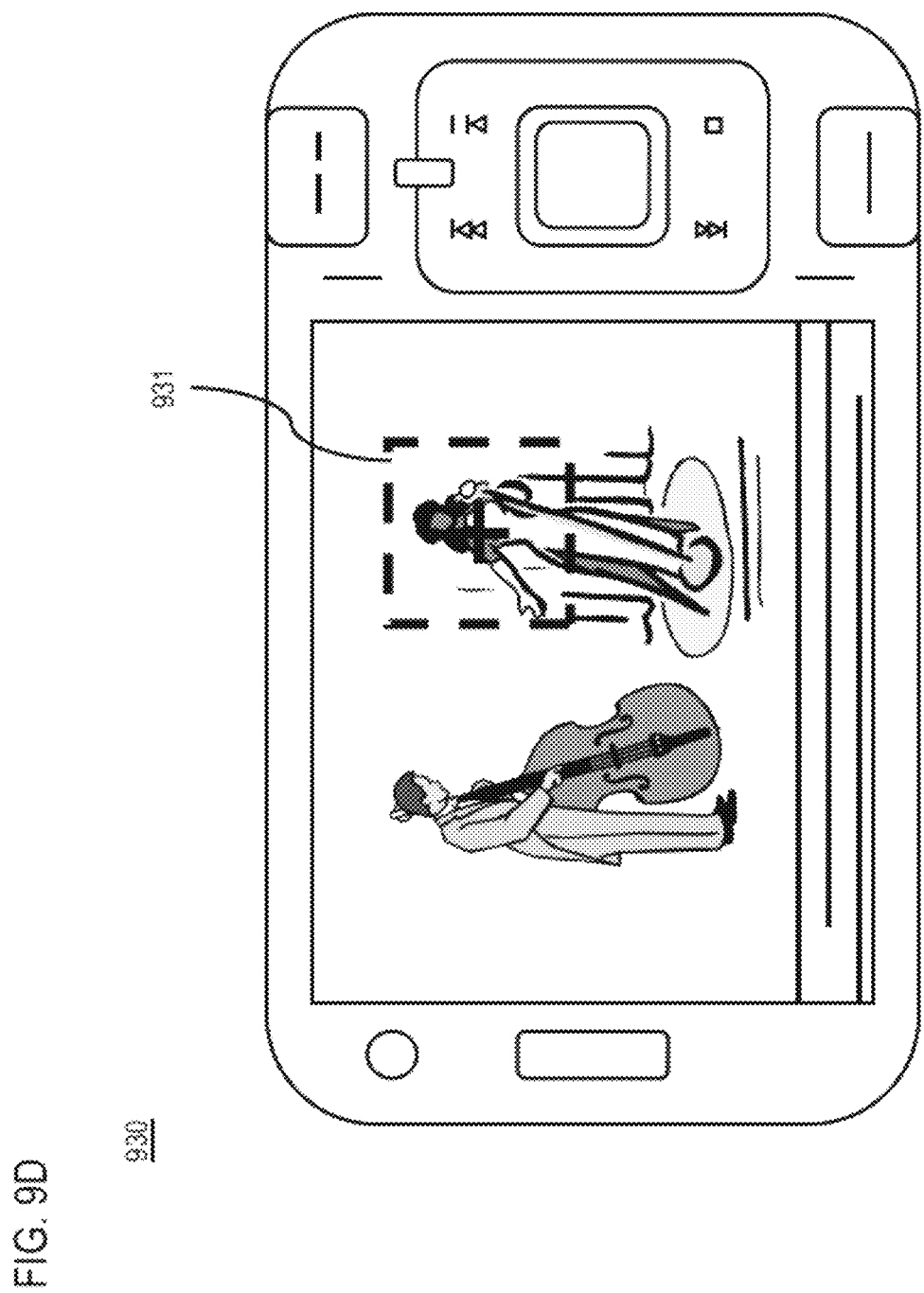
Figure 9E:
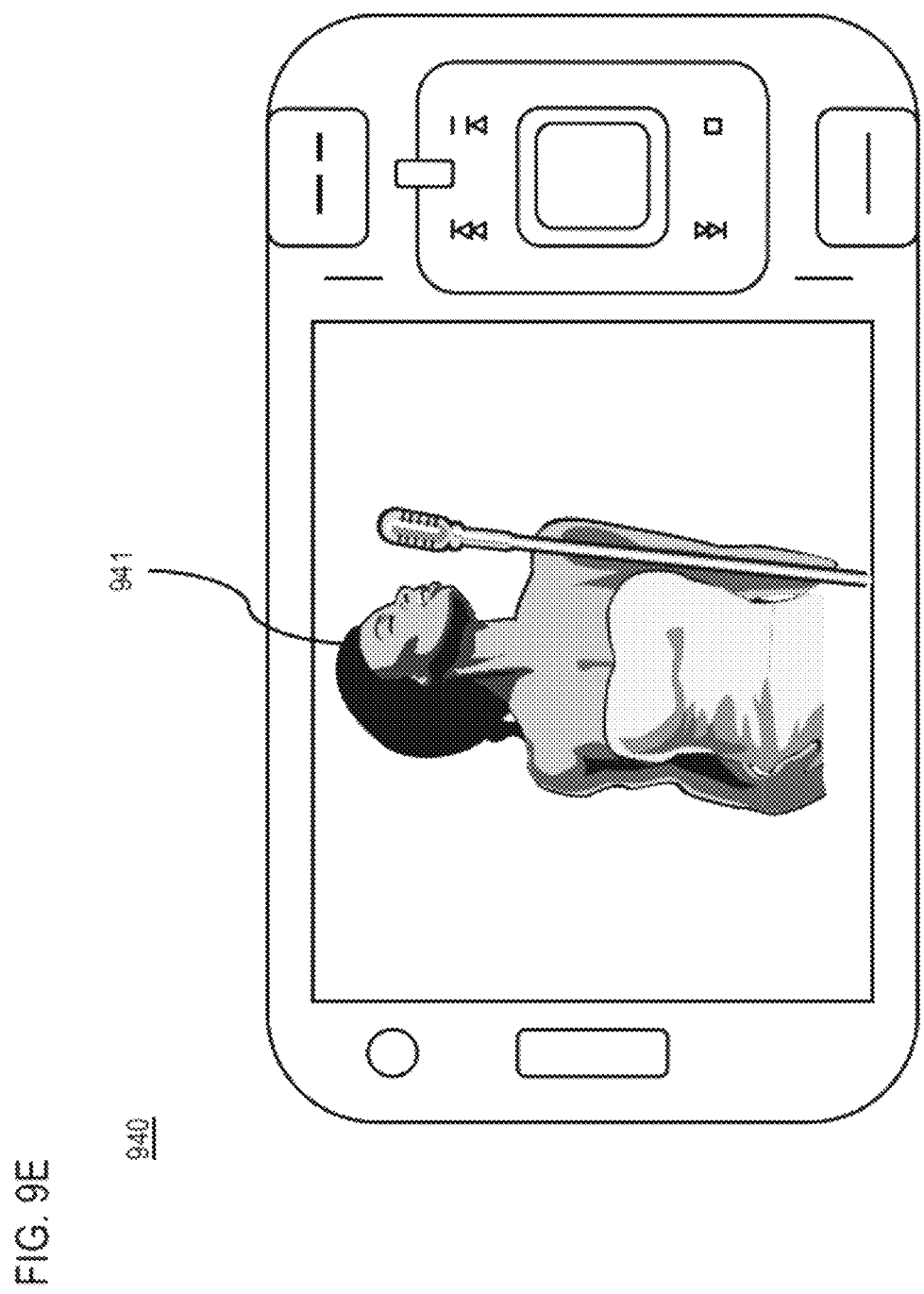

FIGS. 9D and 9E display user interfaces 930, 940 of presentations of a media item compilation. On a touch enabled device, the user can be afforded an opportunity to add criteria to the compilation based on selection. As such, the user can select an area of interest 931. When the area of interest 931 is selected, the media compilation can be dynamically adjusted to include media items based on the selection. User interface 940 can be presented with a focus on that selected section 941. In certain embodiments, the selection can be used as an additional parameter to the criteria. As such, one or more media items associated with the selection can be caused to be presented to the user.

With the above approaches, a compilation of media items can be presented to users based on context vectors. Use of context vectors allows for efficient resource use because an analysis on the actual content need not be utilized to generate the compilation. As such, detection of event points can be done with a higher confidence. Moreover, users can be notified at the time of media creation of advantageous capturing perspectives to increase usability of the media items.

The processes described herein for generating a compilation of media items may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 10:
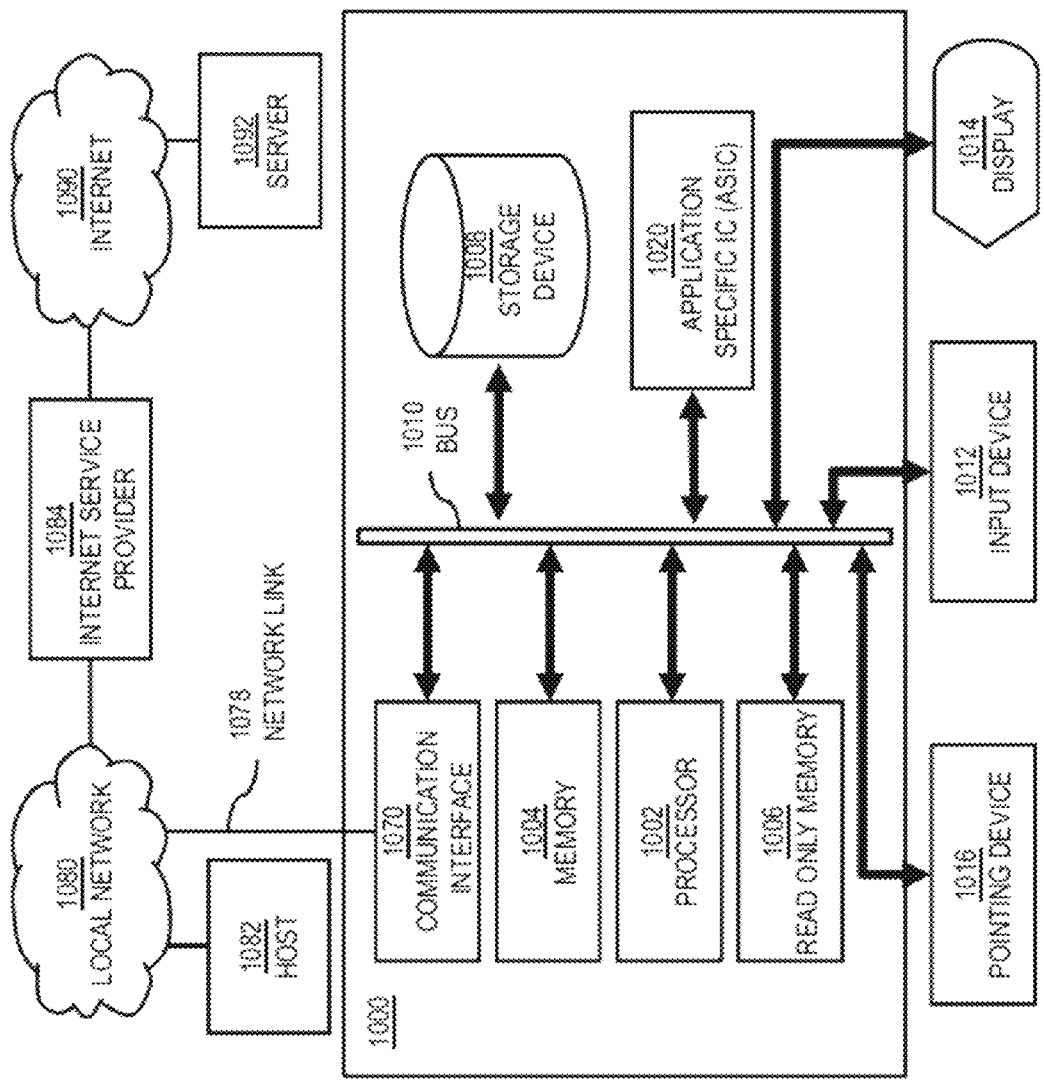
FIG. 10 is a diagram of hardware that can be used to implement an embodiment of the invention.

FIG. 10 illustrates a computer system 1000 upon which an embodiment of the invention may be implemented. Although computer system 1000 is depicted with respect to a particular device or equipment, it is contemplated that other devices or equipment (e.g., network elements, servers, etc.) within FIG. 10 can deploy the illustrated hardware and components of system 1000. Computer system 1000 is programmed (e.g., via computer program code or instructions) to generate a compilation of media items as described herein and includes a communication mechanism such as a bus 1010 for passing information between other internal and external components of the computer system 1000. Information (also called data) is represented as a physical expression of a measurable phenomenon, typically electric voltages, but including, in other embodiments, such phenomena as magnetic, electromagnetic, pressure, chemical, biological, molecular, atomic, subatomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 1000, or a portion thereof, constitutes a means for performing one or more steps of generating a compilation of media items.

A bus 1010 includes one or more parallel conductors of information so that information is transferred quickly among devices coupled to the bus 1010. One or more processors 1002 for processing information are coupled with the bus 1010.

A processor (or multiple processors) 1002 performs a set of operations on information as specified by computer program code related to generate a compilation of media items. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1010 and placing information on the bus 1010. The set of operations also typically include comparing two or more units of information, shifting positions of units of information, and combining two or more units of information, such as by addition or multiplication or logical operations like OR, exclusive OR (XOR), and. Each operation of the set of operations that can be performed by the processor is represented to the processor by information called instructions, such as an operation code of one or more digits. A sequence of operations to be executed by the processor 1002, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 1000 also includes a memory 1004 coupled to bus 1010. The memory 1004, such as a random access memory (RAM) or any other dynamic storage device, stores information including processor instructions for generating a compilation of media items. Dynamic memory allows information stored therein to be changed by the computer system 1000. RAM allows a unit of information stored at a location called a memory address to be stored and retrieved independently of information at neighboring addresses. The memory 1004 is also used by the processor 1002 to store temporary values during execution of processor instructions. The computer system 1000 also includes a read only memory (ROM) 1006 or any other static storage device coupled to the bus 1010 for storing static information, including instructions, that is not changed by the computer system 1000. Some memory is composed of volatile storage that loses the information stored thereon when power is lost. Also coupled to bus 1010 is a non-volatile (persistent) storage device 1008, such as a magnetic disk, optical disk or flash card, for storing information, including instructions, that persists even when the computer system 1000 is turned off or otherwise loses power.

Information, including instructions for generating a compilation of media items, is provided to the bus 1010 for use by the processor from an external input device 1012, such as a keyboard containing alphanumeric keys operated by a human user, or a sensor. A sensor detects conditions in its vicinity and transforms those detections into physical expression compatible with the measurable phenomenon used to represent information in computer system 1000. Other external devices coupled to bus 1010, used primarily for interacting with humans, include a display device 1014, such as a cathode ray tube (CRT), a liquid crystal display (LCD), a light emitting diode (LED) display, an organic LED (OLED) display, a plasma screen, or a printer for presenting text or images, and a pointing device 1016, such as a mouse, a trackball, cursor direction keys, or a motion sensor, for controlling a position of a small cursor image presented on the display 1014 and issuing commands associated with graphical elements presented on the display 1014. In some embodiments, for example, in embodiments in which the computer system 1000 performs all functions automatically without human input, one or more of external input device 1012, display device 1014 and pointing device 1016 is omitted.

In the illustrated embodiment, special purpose hardware, such as an application specific integrated circuit (ASIC) 1020, is coupled to bus 1010. The special purpose hardware is configured to perform operations not performed by processor 1002 quickly enough for special purposes. Examples of ASICs include graphics accelerator cards for generating images for display 1014, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1000 also includes one or more instances of a communications interface 1070 coupled to bus 1010. Communication interface 1070 provides a one-way or two-way communication coupling to a variety of external devices that operate with their own processors, such as printers, scanners and external disks. In general the coupling is with a network link 1078 that is connected to a local network 1080 to which a variety of external devices with their own processors are connected. For example, communication interface 1070 may be a parallel port or a serial port or a universal serial bus (USB) port on a personal computer. In some embodiments, communications interface 1070 is an integrated services digital network (ISDN) card or a digital subscriber line (DSL) card or a telephone modem that provides an information communication connection to a corresponding type of telephone line. In some embodiments, a communication interface 1070 is a cable modem that converts signals on bus 1010 into signals for a communication connection over a coaxial cable or into optical signals for a communication connection over a fiber optic cable. As another example, communications interface 1070 may be a local area network (LAN) card to provide a data communication connection to a compatible LAN, such as Ethernet. Wireless links may also be implemented. For wireless links, the communications interface 1070 sends or receives or both sends and receives electrical, acoustic or electromagnetic signals, including infrared and optical signals, that carry information streams, such as digital data. For example, in wireless handheld devices, such as mobile telephones like cell phones, the communications interface 1070 includes a radio band electromagnetic transmitter and receiver called a radio transceiver. In certain embodiments, the communications interface 1070 enables connection to the communication network 105 for the UE 101.

The term "computer-readable medium" as used herein refers to any medium that participates in providing information to processor 1002, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 1008. Volatile media include, for example, dynamic memory 1004. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 1020.

Network link 1078 typically provides information communication using transmission media through one or more networks to other devices that use or process the information. For example, network link 1078 may provide a connection through local network 1080 to a host computer 1082 or to equipment 1084 operated by an Internet Service Provider (ISP). ISP equipment 1084 in turn provides data communication services through the public, world-wide packet-switching communication network of networks now commonly referred to as the Internet 1090.

A computer called a server host 1092 connected to the Internet hosts a process that provides a service in response to information received over the Internet. For example, server host 1092 hosts a process that provides information representing video data for presentation at display 1014. It is contemplated that the components of system 1000 can be deployed in various configurations within other computer systems, e.g., host 1082 and server 1092.

At least some embodiments of the invention are related to the use of computer system 1000 for implementing some or all of the techniques described herein. According to one embodiment of the invention, those techniques are performed by computer system 1000 in response to processor 1002 executing one or more sequences of one or more processor instructions contained in memory 1004. Such instructions, also called computer instructions, software and program code, may be read into memory 1004 from another computer-readable medium such as storage device 1008 or network link 1078. Execution of the sequences of instructions contained in memory 1004 causes processor 1002 to perform one or more of the method steps described herein. In alternative embodiments, hardware, such as ASIC 1020, may be used in place of or in combination with software to implement the invention. Thus, embodiments of the invention are not limited to any specific combination of hardware and software, unless otherwise explicitly stated herein.

The signals transmitted over network link 1078 and other networks through communications interface 1070, carry information to and from computer system 1000. Computer system 1000 can send and receive information, including program code, through the networks 1080, 1090 among others, through network link 1078 and communications interface 1070. In an example using the Internet 1090, a server host 1092 transmits program code for a particular application, requested by a message sent from computer 1000, through Internet 1090, ISP equipment 1084, local network 1080 and communications interface 1070. The received code may be executed by processor 1002 as it is received, or may be stored in memory 1004 or in storage device 1008 or any other non-volatile storage for later execution, or both. In this manner, computer system 1000 may obtain application program code in the form of signals on a carrier wave.

Various forms of computer readable media may be involved in carrying one or more sequence of instructions or data or both to processor 1002 for execution. For example, instructions and data may initially be carried on a magnetic disk of a remote computer such as host 1082. The remote computer loads the instructions and data into its dynamic memory and sends the instructions and data over a telephone line using a modem. A modem local to the computer system 1000 receives the instructions and data on a telephone line and uses an infra-red transmitter to convert the instructions and data to a signal on an infra-red carrier wave serving as the network link 1078. An infrared detector serving as communications interface 1070 receives the instructions and data carried in the infrared signal and places information representing the instructions and data onto bus 1010. Bus 1010 carries the information to memory 1004 from which processor 1002 retrieves and executes the instructions using some of the data sent with the instructions. The instructions and data received in memory 1004 may optionally be stored on storage device 1008, either before or after execution by the processor 1002.

FIG. 11 illustrates a chip set or chip 1100 upon which an embodiment of the invention may be implemented. Chip set 1100 is programmed to generate a compilation of media items as described herein and includes, for instance, the processor and memory components described with respect to FIG. 10 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 1100 can be implemented in a single chip. It is further contemplated that in certain embodiments the chip set or chip 1100 can be implemented as a single "system on a chip." It is further contemplated that in certain embodiments a separate ASIC would not be used, for example, and that all relevant functions as disclosed herein would be performed by a processor or processors. Chip set or chip 1100, or a portion thereof, constitutes a means for performing one or more steps of providing user interface navigation information associated with the availability of functions. Chip set or chip 1100, or a portion thereof, constitutes a means for performing one or more steps of generating a compilation of media items.

In one embodiment, the chip set or chip 1100 includes a communication mechanism such as a bus 1101 for passing information among the components of the chip set 1100. A processor 1103 has connectivity to the bus 1101 to execute instructions and process information stored in, for example, a memory 1105. The processor 1103 may include one or more processing cores with each core configured to perform independently. A multi-core processor enables multiprocessing within a single physical package. Examples of a multi-core processor include two, four, eight, or greater numbers of processing cores. Alternatively or in addition, the processor 1103 may include one or more microprocessors configured in tandem via the bus 1101 to enable independent execution of instructions, pipelining, and multithreading. The processor 1103 may also be accompanied with one or more specialized components to perform certain processing functions and tasks such as one or more digital signal processors (DSP) 1107, or one or more application-specific integrated circuits (ASIC) 1109. A DSP 1107 typically is configured to process real-world signals (e.g., sound) in real time independently of the processor 1103. Similarly, an ASIC 1109 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 1100 includes merely one or more processors and some software and/or firmware supporting and/or relating to and/or for the one or more processors.

The processor 1103 and accompanying components have connectivity to the memory 1105 via the bus 1101. The memory 1105 includes both dynamic memory (e.g., RAM, magnetic disk, writable optical disk, etc.) and static memory (e.g., ROM, CD-ROM, etc.) for storing executable instructions that when executed perform the inventive steps described herein to generate a compilation of media items. The memory 1105 also stores the data associated with or generated by the execution of the inventive steps.

Figure 12:
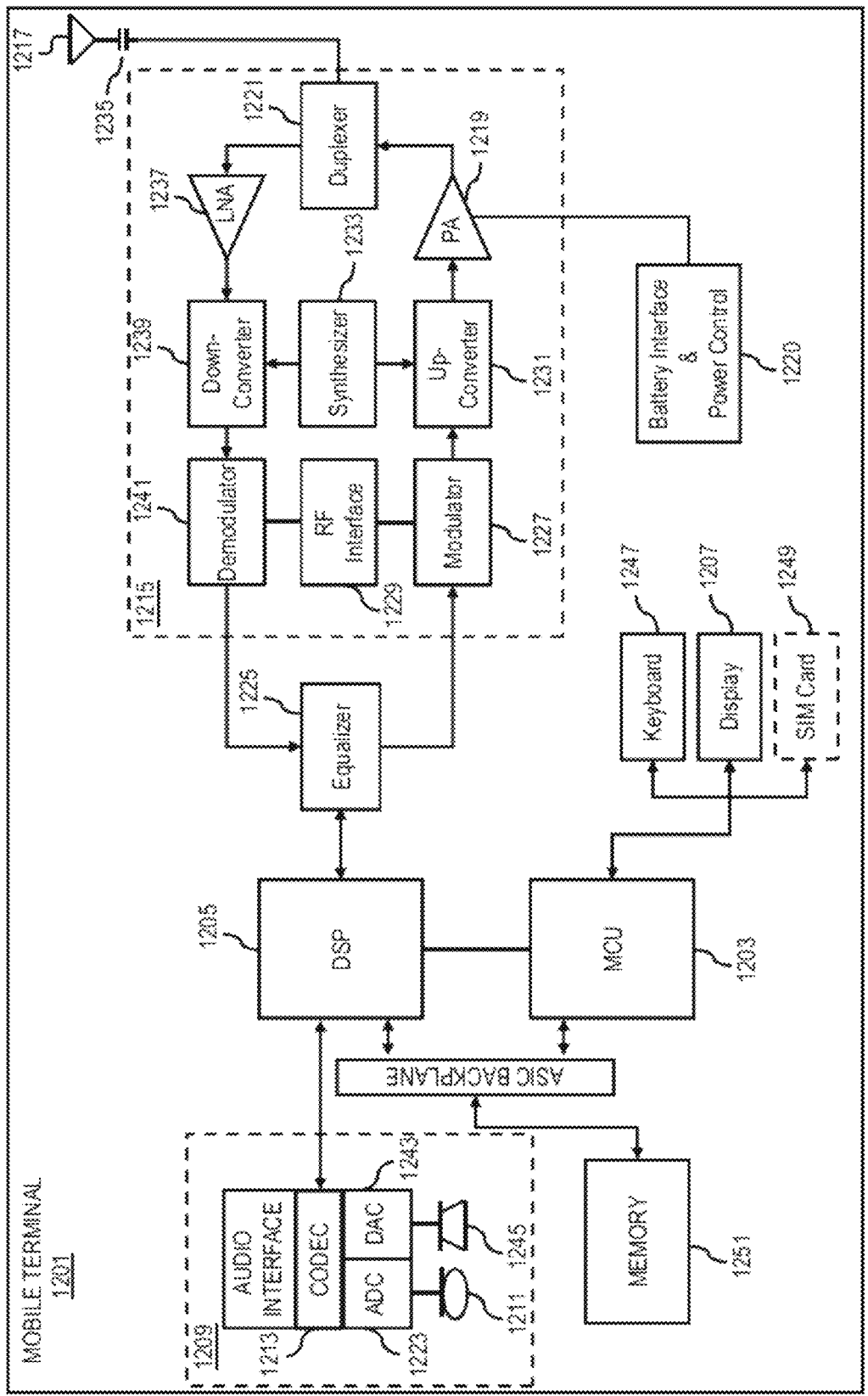
FIG. 12 is a diagram of a mobile terminal (e.g., handset) that can be used to implement an embodiment of the invention.

FIG. 12 is a diagram of exemplary components of a mobile terminal (e.g., handset) for communications, which is capable of operating in the system of FIG. 1, according to one embodiment. In some embodiments, mobile terminal 1201, or a portion thereof, constitutes a means for performing one or more steps of generating a compilation of media items. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1203, a Digital Signal Processor (DSP) 1205, and a receiver/transmitter unit including a microphone gain control unit and a speaker gain control unit. A main display unit 1207 provides a display to the user in support of various applications and mobile terminal functions that perform or support the steps of generating a compilation of media items. The display 1207 includes display circuitry configured to display at least a portion of a user interface of the mobile terminal (e.g., mobile telephone). Additionally, the display 1207 and display circuitry are configured to facilitate user control of at least some functions of the mobile terminal. An audio function circuitry 1209 includes a microphone 1211 and microphone amplifier that amplifies the speech signal output from the microphone 1211. The amplified speech signal output from the microphone 1211 is fed to a coder/decoder (CODEC) 1213.

A radio section 1215 amplifies power and converts frequency in order to communicate with a base station, which is included in a mobile communication system, via antenna 1217. The power amplifier (PA) 1219 and the transmitter/modulation circuitry are operationally responsive to the MCU 1203, with an output from the PA 1219 coupled to the duplexer 1221 or circulator or antenna switch, as known in the art. The PA 1219 also couples to a battery interface and power control unit 1220.

In use, a user of mobile terminal 1201 speaks into the microphone 1211 and his or her voice along with any detected background noise is converted into an analog voltage. The analog voltage is then converted into a digital signal through the Analog to Digital Converter (ADC) 1223. The control unit 1203 routes the digital signal into the DSP 1205 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 1225 for compensation of any frequency-dependent impairments that occur during transmission though the air such as phase and amplitude distortion. After equalizing the bit stream, the modulator 1227 combines the signal with a RF signal generated in the RF interface 1229. The modulator 1227 generates a sine wave by way of frequency or phase modulation. In order to prepare the signal for transmission, an up-converter 1231 combines the sine wave output from the modulator 1227 with another sine wave generated by a synthesizer 1233 to achieve the desired frequency of transmission. The signal is then sent through a PA 1219 to increase the signal to an appropriate power level. In practical systems, the PA 1219 acts as a variable gain amplifier whose gain is controlled by the DSP 1205 from information received from a network base station. The signal is then filtered within the duplexer 1221 and optionally sent to an antenna coupler 1235 to match impedances to provide maximum power transfer. Finally, the signal is transmitted via antenna 1217 to a local base station. An automatic gain control (AGC) can be supplied to control the gain of the final stages of the receiver. The signals may be forwarded from there to a remote telephone which may be another cellular telephone, any other mobile phone or a landline connected to a Public Switched Telephone Network (PSTN), or other telephony networks.

Voice signals transmitted to the mobile terminal 1201 are received via antenna 1217 and immediately amplified by a low noise amplifier (LNA) 1237. A down-converter 1239 lowers the carrier frequency while the demodulator 1241 strips away the RF leaving only a digital bit stream. The signal then goes through the equalizer 1225 and is processed by the DSP 1205. A Digital to Analog Converter (DAC) 1243 converts the signal and the resulting output is transmitted to the user through the speaker 1245, all under control of a Main Control Unit (MCU) 1203 which can be implemented as a Central Processing Unit (CPU) (not shown).

The MCU 1203 receives various signals including input signals from the keyboard 1247. The keyboard 1247 and/or the MCU 1203 in combination with other user input components (e.g., the microphone 1211) comprise a user interface circuitry for managing user input. The MCU 1203 runs a user interface software to facilitate user control of at least some functions of the mobile terminal 1201 to generate a compilation of media items. The MCU 1203 also delivers a display command and a switch command to the display 1207 and to the speech output switching controller, respectively. Further, the MCU 1203 exchanges information with the DSP 1205 and can access an optionally incorporated SIM card 1249 and a memory 1251. In addition, the MCU 1203 executes various control functions required of the terminal. The DSP 1205 may, depending upon the implementation, perform any of a variety of conventional digital processing functions on the voice signals. Additionally, DSP 1205 determines the background noise level of the local environment from the signals detected by microphone 1211 and sets the gain of microphone 1211 to a level selected to compensate for the natural tendency of the user of the mobile terminal 1201.

The CODEC 1213 includes the ADC 1223 and DAC 1243. The memory 1251 stores various data including call incoming tone data and is capable of storing other data including music data received via, e.g., the global Internet. The software module could reside in RAM memory, flash memory, registers, or any other form of writable storage medium known in the art. The memory device 1251 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1249 carries, for instance, important information, such as the cellular phone number, the carrier supplying service, subscription details, and security information. The SIM card 1249 serves primarily to identify the mobile terminal 1201 on a radio network. The card 1249 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
receiving a plurality of media items and context vectors from a plurality of mobile devices, wherein respective context vectors are associated with the creation of respective media items from the plurality of media items based, at least in part, on at least one of a location or a position, an altitude, a tilt, an orientation, a zoom, a focal length, a field of view, a radius of interest, a range of interest, or a combination thereof associated with at least one of the plurality of mobile devices;
determining at least one focal point with respect to the at least one of the plurality of mobile devices based on at least one or more of the received media items and context vectors;
processing the respective context vectors for the plurality of media items, wherein the processed context vectors include, at least in part, orientation information, location information, timing information, or a combination thereof associated with the creation of respective media items; and
generating a compilation of at least a portion of the media items based, at least in part, on the processed context vectors and the at least one focal point.

2. The method of claim 1, further comprising:
determining one or more regions of interest of the media items based, at least in part, on the processed context vectors,
wherein the compilation is further based, at least in part, on the one or more regions of interest.

3. The method of claim 1, further comprising:
determining one or more criteria, one or more user preferences, or a combination thereof for selecting from among the media items,
wherein the compilation is further based, at least in part, on the selection.

4. The method of claim 3,
wherein the one or more criteria relate to a classification of one or more panning events, associated with the media items detected, based, at least in part, on the processed context vectors.

5. The method of claim 1,
wherein the media items are captured live, the method further comprising:
determining one or more characteristics of already captured media items; and
determining to direct capturing of subsequent media items based, at least in part, on the one or more characteristics.

6. The method of claim 5,
wherein determining to direct capturing of subsequent media items is based on the receipt of one or more messages.

7. The method of claim 1, further comprising:
determining one or more events based, at least in part, on the processed context vectors,
wherein the compilation is further based, at least in part, on the one or more events.

8. The method of claim 1, further comprising:
determining one or more ratings associated with the media items,
wherein the compilation is further based, at least in part, on the one or more ratings.

9. The method of claim 1, further comprising:
determining to provide the compilation, the media items, or a combination thereof on a web portal.

10. The method of claim 1,
wherein the received context vectors further comprise orientation data including accelerometer data, magnetometer data, altimeter data, zoom level data, focal length data, field of view data, range sensor data, or a combination thereof.

11. An apparatus comprising:
at least one processor; and
at least one memory including computer program code for one or more programs,
the at least one memory and the computer program code configured to, with the at least one processor, cause the apparatus to perform at least the following,
receive a plurality of media items and context vectors from a plurality of mobile devices,
wherein respective context vectors are associated with the creation of respective media items from the plurality of media items based, at least in part, on at least one of a location or a position, an altitude, a tilt, an orientation, a zoom, a focal length, a field of view, a radius of interest, a range of interest, or a combination thereof associated with at least one of the plurality of mobile devices,
determine at least one focal point with respect to the at least one of the plurality of mobile devices based on at least one or more of the received media items and context vectors;
process the respective context vectors for the plurality of media items, wherein the processed context vectors include, at least in part, orientation information, location information, timing information, or a combination thereof associated with the creation of respective media items, and
generate a compilation of at least a portion of the media items based, at least in part, on the processed context vectors and the at least one focal point.

12. The apparatus of claim 11,
wherein the apparatus is further caused to:
determine one or more regions of interest of the media items based, at least in part, on the processed context vectors,
wherein the compilation is further based, at least in part, on the one or more regions of interest.

13. The apparatus of claim 11,
wherein the apparatus is further caused to:
determine one or more criteria, one or more user preferences, or a combination thereof for selecting from among the media items,
wherein the compilation is further based, at least in part, on the selection.

14. The apparatus of claim 13,
wherein the one or more criteria relate to a classification of one or more panning events, associated with the media items detected, based, at least in part, on the processed context vectors.

15. The apparatus of claim 11,
wherein the media items are captured live, and wherein the apparatus is further caused to:
determine one or more characteristics of already captured media items, and
determine to direct capturing of subsequent media items based, at least in part, on the one or more characteristics.

16. The apparatus of claim 11,
wherein the apparatus is further caused to:
determine one or more events based, at least in part, on the processed context vectors,
wherein the compilation is further based, at least in part, on the one or more events.

17. The apparatus of claim 11,
wherein the apparatus is further caused to:
determine one or more ratings associated with the media items,
wherein the compilation is further based, at least in part, on the one or more ratings.

18. The apparatus of claim 11,
wherein the apparatus is further caused to:
determine to provide the compilation, the media items, or a combination thereof on a web portal.

19. The apparatus of claim 11,
wherein the received context vectors further comprise orientation data including accelerometer data, magnetometer data, altimeter data, zoom level data, focal length data, field of view data, range sensor data, or a combination thereof.

20. A method comprising:
capturing a plurality of media items and context vectors relating to an event with a plurality of mobile devices,
wherein respective context vectors are associated with the creation of respective media items from the plurality of media items based, at least in part, on at least one of a location or a position, an altitude, a tilt, an orientation, a zoom, a focal length, a field of view, a radius of interest, a range of interest, or a combination thereof associated with the plurality of mobile devices;
determining information about the occurrence of the event by evaluating one or more of the context vectors associated with the event;
utilizing the context vectors to determine at least one focal point associated with at least one of the plurality of mobile devices associated with the event; and
synthesizing, from the at least one focal point, a compilation of at least a portion of the media items based, at least in part, on the evaluated context vectors and the at least one focal point.

21. The method of claim 20, further comprising:
separating the context vectors from the media items; and
transmitting the context vectors to a media platform;
wherein the context vectors are transmitted in real time while the media items are transmitted at a subsequent time.

22. The method of claim 20, further comprising:
sorting the event based on location;
publishing the media items to one or more mobile terminals;
extracting an identifier associated with a particular mobile terminal from a received context vector;
associating the particular mobile terminal with a profile;
collecting historical event information about the particular mobile terminal based on the profile; and
determining the usefulness of associated media items in the compilation based on the collected historical event information.

* * * * *